United States Patent [19]
Tanaka et al.

[11] Patent Number: 5,327,417
[45] Date of Patent: Jul. 5, 1994

[54] OPTICAL DISK DRIVE AND READ/WRITE APPARATUS

[75] Inventors: Katsuhiko Tanaka; Hideki Okatani; Michihiro Kuramochi; Tetsuji Aoyagi, all of Kanagawa, Japan

[73] Assignee: NSK Ltd., Tokyo, Japan

[21] Appl. No.: 952,691

[22] Filed: Sep. 28, 1992

[30] Foreign Application Priority Data

| Sep. 27, 1991 | [JP] | Japan | 3-248981 |
| Dec. 4, 1991 | [JP] | Japan | 3-320499 |
| Dec. 13, 1991 | [JP] | Japan | 3-330497 |
| Dec. 13, 1991 | [JP] | Japan | 3-330498 |
| Feb. 28, 1992 | [JP] | Japan | 4-043925 |
| Feb. 28, 1992 | [JP] | Japan | 4-043928 |
| Sep. 9, 1992 | [JP] | Japan | 4-240956 |

[51] Int. Cl.$^5$ .............................. G11B 7/00
[52] U.S. Cl. ..................... 369/219; 369/13; 369/244
[58] Field of Search ........... 369/13, 215, 219, 244; 360/114

[56] References Cited

U.S. PATENT DOCUMENTS

| 4,058,834 | 11/1977 | Miyaoka | 369/219 |
| 5,072,432 | 12/1991 | Tanaka | 360/114 |
| 5,149,617 | 9/1992 | Gotoh et al. | 369/244 |
| 5,182,734 | 1/1993 | Watanabe | 360/114 |
| 5,182,735 | 1/1993 | Kurtz | 360/114 |
| 5,208,792 | 5/1993 | Imanaka | 360/114 |

FOREIGN PATENT DOCUMENTS

| 0218250 | 4/1987 | European Pat. Off. . |
| 0252445 | 1/1988 | European Pat. Off. . |
| 63-225931 | 9/1988 | Japan . |
| 63-225932 | 9/1988 | Japan . |
| 312390 | 2/1991 | Japan . |
| 275815 | 6/1991 | Japan | 369/244 |
| 342998 | 9/1991 | Japan | 369/244 |
| 8602767 | 5/1986 | PCT Int'l Appl. . |

Primary Examiner—Louis J. Casaregola
Assistant Examiner—Peter Korytnyk
Attorney, Agent, or Firm—Sughrue, Mion, Zinn, Macpeak & Seas

[57] ABSTRACT

In order to provide an optical disk drive and read/write apparatus, the time of erasure, recording and reproduction of data by which is shortened to heighten the apparatus in access speed and data transfer speed, in the apparatus according to the present invention, an optical disk 4 is clamped to a turntable 2 supported with bearings 24 by a housing, and an optical head 5 is movably supported by the housing so as to face the disk. Four such optical heads 5 are disposed at equiangular intervals on a circle, and controlled independently of each other to perform the erasure, recording and reproduction of data from and in the disk 4 so as to make the apparatus much higher in access speed and data transfer speed than in the case that only one optical head is used.

18 Claims, 14 Drawing Sheets

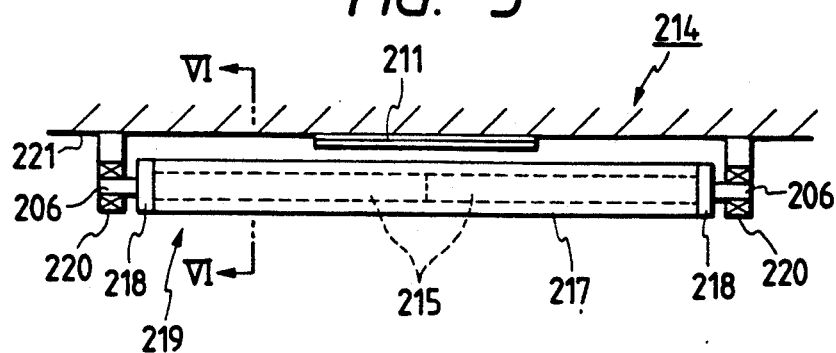
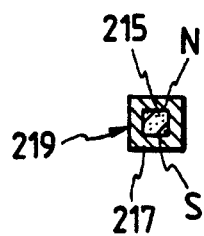
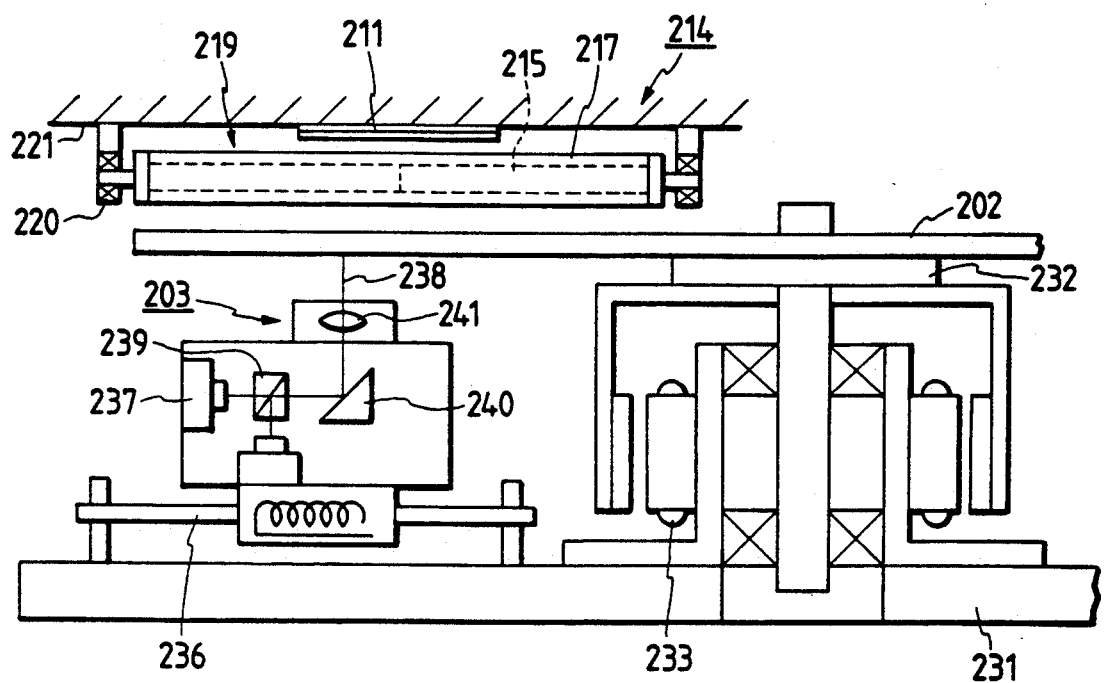
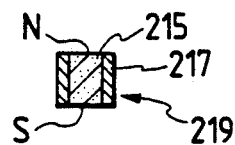

OPTICAL DISK DRIVE AND READ/WRITE APPARATUS

BACKGROUND OF THE INVENTION

The present invention relates to a drive and read/write apparatus for an optical disk, more particularly to a drive and read/write apparatus for a rewritable optical disk.

The present invention also relates to an improved bias magnet device for magneto-optical disk drive and read/write apparatus.

The present invention also relates to an improved device for positioning the optical head of an optical disk drive and read/write apparatus, particularly to shorten the access time thereof.

The present invention furthermore relates to an optical disk drive and read/write apparatus, and more particularly relates to an improved drive and read/write apparatus appropriate to record or write information in an optical disk on both the sides thereof.

The present invention still further relates to a divided-type optical head for an optical disk drive and read/write apparatus, and more particularly relates to a divided-type optical head improved to effectively prevent the efficiency of concentration of a laser beam from being deteriorated by the fluctuation in the posture of the movable optical system of the head.

FIG. 23 shows a conventional drive and read/write apparatus for an optical disk. The apparatus is a magneto-optical disk drive and read/write apparatus including only one optical head 5 in such a position as to be opposed to a bias magnet 13 across the magneto-optical disk 4. In the apparatus, a motor 3 for rotating a turntable 2 at a prescribed speed is provided on the base of a housing 1 so that the disk 4 clamped to the turntable by a loading mechanism not shown in the drawing can be turned at an accurate speed by the motor. The optical head 5 is moved by a linear motor 6 so as to be opposed to a prescribed position on the disk 4 to read or write data from or in the disk, namely, to reproduce or erase and record signals.

When new data is to be written or recorded in the optical disk 4 by the apparatus, a laser beam 8 is horizontally emitted from a semiconductor laser module 7, transmitted through a polarized beam splitter 9, diverted upward by a prism 10, and concentrated to the written or recorded position of the data in the disk through an objective lens 11 to heat the beam-irradiated portion of the disk above the Curie temperature thereof by the spot of the beam thereon to magnetize the portion in the direction of the magnetic field of the bias magnet 13 to erase existing data from the portion first. By the time the disk 4 is then rotated by another round to have the same positional relationship with the head 5 and the magnet 13 as at the time of erasure, a direction is selected for the magnetic field of the magnet so as to be coincident with the direction of magnetization of the portion for the writing or recording of the new data. The portion is then heated by the spot of the beam thereon so that the new data is written or recorded in the portion through the magnetization thereof in the selected direction. The disk 4 is turned by yet another round to check whether the new data have been precisely written or recorded in the portion of the disk, if necessary.

When data is to be read or reproduced from the disk 4 by the apparatus, the intensity of the laser beam 8 is made lower than at the time of the writing or recording of data in the disk so as to heat the beam-irradiated portion thereof below the Curie temperature of the disk. The optical head 5 is moved to be opposed to the portion from which the data is to be read or reproduced. The laser beam 8 is then irradiated upon the portion. The direction of rotation of the plane of polarization of light 14 reflected by the portion changes depending on the direction of the magnetization of the magneto-optical film of the portion. The changed direction is detected to read or reproduce the data from the portion.

In the apparatus, a shaft 2a supporting the turntable 2 is rotatably supported with two ball bearings 2b. The optical head 5 is coupled to the linear motor 6 so that the head can be straightly moved along the radial direction of the disk 4 by the motor in order to be opposed to the aimed track of the disk.

The disk 4 is used as it remains housed in a conventional cassette 15 shown in FIGS. 24 and 25. The cassette 15 includes a body 17 in which the disk 4 is housed, and a shutter 19 for opening and closing the openings 18a and 18b of the upper and lower sides of the body. If the disk 4 has a data storage portion on only one side of the disk, the lower side of the body 17 of the cassette 15 has the opening 18 as a passage corresponding to the range of the movement of the optical head 5, and the other opening 18b as a center hole corresponding to the hub 16 of the disk 4 to clamp it to the turntable 2, and the upper side of the body has the yet other opening 18a as a passage corresponding to the bias magnet 13 to face it, as shown in FIGS. 24 and 25. If the disk 4 has data storage portions on both the sides of the disk, one of the upper and lower sides of the cassette body 17 has the opening 18a as such a passage for the optical head 5 or the bias magnet 13, and the other opening 18b as such a center hole for the hub 16, and the other of the sides has the yet other opening 18a as such a passage for the magnet or the head, and the yet other opening 18b as such a center hole for the hub.

Since the conventional apparatus has the only one optical head 5 and the only one bias magnet 13, each of the upper and lower sides of the body 17 of the cassette 15 needs to have only one opening 18a as a passage for the head or the magnet. For that reason, the space in which the shutter 19 for preventing dust or the like from entering to the data storage surface of the disk 4 through the openings 18a and 18b is provided on the cassette body 17 can be secured thereon.

A conventional magneto-optical disk drive and read/write apparatus includes a bias magnet device 54 which is located near one side 52b of a magneto-optical disk 52 and opposed to an optical head 53 which faces the data storage side 52a of the disk, as shown in FIG. 26. To erase existing data and then record new data in the data storage surface 52a of the disk 52, a semiconductor laser beam of high intensity is projected to a prescribed position on the data storage surface through the optical head 53 to heat the storage film of the beam-irradiated portion of the disk above the Curie temperature thereof of make the direction of the magnetization of he film coincide with that of the magnetic field of the bias magnet device 54, thus erasing the existing data. By the time the disk 52 is thereafter reacted by another round to have the same positional relationship with the head 53 and the magnet device 54 as set at the time of the erasure, a direction is selected for the magnetic field of the bias magnet device 54 depending on the direction of magnetization for the new data. The laser beam is then projected again to the position on the storage surface 52a of the disk 52 through the head 53 to heat the storage film of the beam-irradiated portion of the disk, thus recording the new data in the portion through the magnetization thereof depending on the direction of the magnetic field of the magnet device 54.

To reproduce recorded data from the disk 52, the laser beam is lowered in intensity and projected to the recorded position of the data on the disk through the optical head 53. At that time, the direction of the rotation of the plane of polarization of disk-reflected light changes depending on the direction of the magnetization of the data storage film of the beam-irradiated portion of the disk 52. The changed direction is detected to read or reproduce the data.

If the apparatus is a conventional one for a magneto-optical disk of 5.25 inches or 130 mm in diameter, the bias magnet device 54 includes a movable part 59 having a permanent magnet 55 and shafts 56 supporting the magnet at the both ends thereof, plain bearings 60 supporting the movable part 59 at the shafts 56 rotatably, and a coil 61 for turning the movable part over. To record data in the disk 52, the direction of an electrical current for the coil 61 is altered to turn the movable part 59 over to select a direction for the magnet field of the permanent magnet 55 depending on the data.

The permanent magnet 55 is disposed so that the axis thereof extends along the radial direction of the disk 52. Since the magnet 55 is not moved along the radial direction of the disk, the axial dimension of the magnet needs to be not less than the radial dimension of the data storage surface 52a of the disk. The magnet 55 is usually made of a rare-earth element to generate a magnetic field strong enough to erase and record data from and in the storage surface 52a of the disk 52.

FIG. 27 shows a conventional device for positioning the optical head of an optical disk drive and read/write apparatus. The movable portion of an optical head 75 is mounted on a carriage 77 so as to be moved by a linear motor 78 along the radial direction of an optical disk 74 to position the head at the aimed track of the disk. At that time, the number of lead grooves 74a provided in the disk 74 in advance as shown in FIG. 28 is counted to seek the aimed track to position the head 75 thereat.

FIG. 29 shows magneto-optical disk and read/write apparatus which is a conventional drive and read/write apparatus for an optical disk. In the apparatus, a turntable 82 is supported with ball bearings 83 by a housing 81 so that the turntable can be rotated by a motor 84. The magneto-optical disk 85 is clamped to the turntable 82 so as to be handled by the apparatus. An optical head 86 and a bias magnet 87 are opposed to each other across the disk 85. The head 86 is supported by the housing 81 and a linear motor 88 which is for moving the head. The head 86 is moved along the radial direction of the disk 85 by the linear motor 88 to read or write data in a prescribed position from or in the disk or to erase, record or reproduce a signal from or in the disk.

When the disk 85 which is a data storage medium is in use, it is housed in a cassette 90 shown in FIG. 30 and 31. The cassette 90 includes a body 91 in which the disk 85 is rotatably housed. The body 91 has opening which are passages 92a corresponding to the range of the movement of the optical head 86, and a center hole 92b corresponding to a hub 93 for clamping the disk 85 to the turntable 82. The cassette 90 also includes a shutter 94 for preventing dust or the like from entering to the surface of the disk 85 through the openings. The disk 85 is a one-side data storage disk having a data storage portion on only one side of the disk, or a both-side data storage disk having data storage portions on both the sides of the disk. If data stored in one side of the both-side data storage disk is to be read or reproduced therefrom by the conventional drive and read/write apparatus, the disk is clamped to the turntable 82 so that the side faces the optical head 86. When data stored in the other side of the both-side data storage disk is to be read or reproduced therefrom by the apparatus, the disk is clamped to the turntable 82 so that the side faces the optical head 86.

FIG. 32 shows a conventional divided-type optical head 01 for an optical disk drive and read/write apparatus. The head 01 is dividedly made of a moveable optical system 02 of relatively small weight, and a fixed optical system 03 of relatively large weight. The movable optical system 02 has a carriage 08 including an upward diverting mirror 05 for diverting a horizontally-incident laser beam 04 upward, and an objective lens 07 for forming a small spot of the beam on the surface of an optical disk 06. The carriage 08 is moved along the radial direction of the disk 06 by a linear motor not show in FIG. 32, to position the small spot of the beam 04 on the aimed track of the disk.

However, the conventional drive and read/write apparatus for the magneto-optical disk shown in FIGS. 23-25 has a problem that the apparatus is lower in access speed and data transfer speed than a magnetic disk drive and read/write apparatus so as to make it impossible to fully utilize the advantage of the former apparatus that the magneto-optical disk is high in storage capacity and can be replaced. In other words, since the erasure, recording and reproduction of data are performed through the single optical head of the former apparatus and the disk needs to be rotated by one round for each of the erasure, recording and reproduction, the recording of new data in the disk takes time during which the disk is rotated by two or three rounds. Even if the rotation speed of the disk is heightened to cope with the problem, the heightening is limited by the output power of the semiconductor laser module and the sensitivity of the disk so that it is difficult to shorten the time of data recording in the disk. It is also difficult to heighten the rotation speed of the disk to shorten the time of data reading or reproduction from the disk. As a result, the problem remains unsolved.

Accordingly, it is an object of a first aspect of the present invention to provide an optical disk drive and read/write apparatus in which the time which is takes for the apparatus to perform the erasure, recording and reproduction of data from and in an optical disk is shortened to heighten the access speed and data transfer speed.

To heighten the data storage capacity of the magneto-optical disk 52 as shown in FIG. 26, the diameter thereof is increased to enlarge the data storage surface 52a of the disk. If the diameter is increased, the axial dimension of the permanent magnet 55 of the bias magnet device 54 needs to be augmented. However, if the magnet 55 is made of the rare-earth element, the magnet is not high enough in mechanical tenacity and is therefore difficult to process and easy to break. In that case, the magnet 55 requires much carefulness in handing, and is difficult to be made large in length. This is a problem. For that reason, if the magnet 55 is to be lengthen, it cannot be made of the rare-earth element generate strong magnetic field to allow the use of a magneto-optical disk of low magnetizability.

Accordingly, it is an object of a second aspect of the present invention to provide a large-sized bias magnet device in which a bias magnet made of a rare-earth element to have strong magnetism can be included for even a magneto-optical disk whose diameter is not less than 12 inches (300 mm).

In order to detect track information from the lead grooves 74a of the optical disk 74 through the optical head 75 to position it at the aimed track of the disk, the conventional device shown in FIGS. 27 and 28 needs to seek the track through tracking servo control while vertically and slightly moving the objective lens of the head through the focusing servo control of the objective lens actuator (which is a two-axis actuator) of the head to always focus a laser beam on the surface of the disk. Because of the responding properties of mechanisms for the tracking and focusing control, there is a limit on the increase in the speed of the seeking of the aimed track. This is a problem.

Since the seeking of the aimed track is likely to be affected by the eccentricity between the axis of the disk 74 and that of a rotary motor for the disk and the warp of the disk, the number of the lead grooves 74a of the disk tends to be miscounted at the time of rapid seeking of the track so that it takes more time to position the optical head 75 at the track, and that in an extreme case, the tracking servo control fails to be properly done for the positioning. This is also a problem.

The present invention was made in order to solve the above-mentioned problems. Accordingly, it is an object of a third aspect of the present invention to provide a device for rapidly and accurately positioning the optical head of an optical disk drive and read/write apparatus at the aimed track of an optical disk.

The conventional drive and read/write apparatus for the optical disk shown in FIGS. 29-31 is lower in access speed and data transfer speed than a magnetic disk drive and read/write apparatus. This is a problem. For that reason, the feature of the optical disk that it is high in storage capacity and can be replaced with another one cannot be fully utilized.

As for the conventional apparatus, each of the erasure, recording and reproduction of data is performed through the only one optical head, and requires that the optical disk is rotated by one round. To record new data in the disk, a light beam is emitted from a semiconductor laser module and concentrated to the position of the recording in the disk through the optical head 86 to heat the beam-irradiated portion of the disk by the spot of the beam thereon to magnetize the portion in the direction of the magnetic field of the bias magnet 87 to erase existing data from the portion first. By the time the optical disk 85 is thereafter rotated by another round to have the same positional relationship with the optical head 86, a direction is selected for the magnetic field of the bias magnet 87 so as be coincident with the direction of magnetization of the portion of the disk for new data. The portion is then heated again by the spot of the beam thereon so as to be magnetized in the selected direction of the magnetic field of the magnet 87 to record the new data in the portion. The disk 85 is thereafter rotated by yet another round to check whether the new data have been precisely recorded in the disk, if necessary. Therefore, the recording of such new data in the disk 85 requires the two or three rounds of rotation of the disk 85, and therefore takes much time. This is also a problem.

To record data in both the sides if the both-side data storage disk by the apparatus, the data is recorded in one of the sides first, and thereafter recorded in the other of them. This is a problem of inconvenience. Even if the rotated speed of the disk is increased to cope with problem, the speed is limited by the output power of the semiconductor laser module an the sensitivity of the disk to make it difficult to shorten the time of the recording.

Since the only one optical head 86 is provided to face one side of the disk 85, data stored in both the sides thereof cannot simultaneously be read or reproduced therefrom. Particularly when it is not known the side which is the data is stored in, the disk often needs to be turned over to search for the stored position of the data. This is a problem of long time consumption.

Accordingly, it is an object of forth and fifth aspects of the prevent invention to provide an optical disk drive and read/write apparatus shortened in the time of erasure, recording and reproduction of data from and in an optical disk, short in access time, high in data transfer speed, and capable of erasing, recording and reproducing data from and in the disk on both the sides thereof simultaneously.

Since there is a slight clearance between the bearing and guide of the linear motor, the carriage 08 of the conventional optical head 01 as shown in FIG. 32 performs a pitching motion about an axis X, a rolling motion about an axis Y, and a yawing motion about an axis Z as the movable optical system 02 is moved along the radial direction of the optical disk 06, in the direction of the axis Y perpendicular to the other axes X and Z perpendicular to each other. For that reason, the optical axis for the laser beam 04 to the upward diverting mirror 05 of the movable optical system 02 deviates, and the incident angle of the beam to the mirror fluctuates. As a result, the efficiency of concentration of the laser beam 04 to the surface of the optical disk 06 is deteriorated. This is a problem.

The problem is described in detail with reference to FIG. 32 from now on. The upward diverting mirror 05 and the objective lens 07 are put in a prescribed positional relationship with each other at the time of assembly of the carriage 08. If the carriage 08 is tilted by a pitching angle 8 due to the pitching motion of the movable optical system 02 as it is moved by the linear motor, the incident angle of the laser beam 04 from the fixed optical system 03 to the mirror 05 deviates by the pitching angle from a proper value so that incident angle of the beam to the objective lens 07 changes by the tilting angle $\theta$ thereof from the vertical plane extending through the lens. As a result, the incident angle of the beam 04 to the surface of the disk 06 changes by the sum 20 of the pitching angle 0 and the tilting angle $\theta$. Therefore, the efficiency of concentration of the beam 04 to the surface of the disk 06 is deteriorated from that in the case of the normal perpendicular incidence of the beam to the surface of the disk.

If the diameter of the optical disk 06 is increased to heighten the capacity thereof, the length of the movement of the carriage 08 along the radial direction of the disk is segmented to make it more difficult to reduce the pitching, rolling and yawing notions of the movable optical system 02.

Accordingly, it is an object of a sixth aspect of the present invention to provide an optical head which operates so that even if the carriage of the movable optical system thereof fluctuates in posture or performs a pitching motion during the movement of the system, a laser beam is irradiated upon the surface of an optical disk through the head perpendicularly to the surface of the disk does not move up and down but rotates on a prescribed plane.

SUMMARY OF THE INVENTION

In the optical disk drive and read/write apparatus provided in accordance with a first aspect of the present invention, the optical disk is clamped to a rotary member supported with bearings-by a housing, and four optical heads are movably supported by the housing so as to face the disk. The four optical heads are disposed on a circle so that four virtual straight lines extending from the heads toward the axis of rotation of the rotary member have equiangular intervals of about 90 degrees in central angle.

The bias magnet device provided in accordance with a second aspect of the present invention is characterized by including a movable part having a plurality of permanent magnets coupled to each other in the axial direction thereof, and a reinforcing member holding the magnets; bearings supporting the part at both the ends thereof; and a coil facing the part in order to turn it over.

The device provided in accordance with a third aspect of the present invention includes a linear motor for moving the movable portion of the optical head along the radial direction of the optical disk. The device is characterized in that the linear motor is provided with a linear scale whose graduations have a pitch equal to that of the tracks of the disk or to the product of the latter pitch and the reciprocal of an integer, and a position detector which reads the graduations.

In an optical disk drive and read/write apparatus provided in accordance with a fourth aspect of the present invention, the optical disk is clamped to a rotary member supported with bearings by a housing, and optical heads are supported by the housing so as to face the disk. The example is characterized in that two virtual straight lines extending toward the axis of rotation of the optical disk from the two optical heads disposed to face one side of the disk form mutually-equal central angles of about 180 degrees; and other two virtual straight lines extending toward the axis from the other two optical heads disposed to face the other side of the disk form mutually-equal central angles of about 180 degrees a well.

In an fifth aspect of the present invention, the optical disk is clamped to a rotary member supported with bearings by a housing, and optical heads are supported by the housing so as to face the disk. The example is characterized in that four virtual straight lines extending toward the axis of rotation of the optical disk from the four optical heads disposed to face one side of the disk form mutually-equal central angles of about 90 degrees; and other four virtual straight lines extending toward the axis from the other four optical heads disposed to face the other side of the disk form mutually-equal central angles of about 90 degrees as well.

In the optical head provided in accordance with a sixth aspect of the present invention, the movable optical system and a fixed optical system are divided from each other, and the movable system includes beam diverting means by which the laser beam emitted from the fixed optical system to the movable one is diverted to be irradiated upon the surface of the optical disk. The head is characterized in that the beam diverting means is a pentaprism.

Since the four optical heads of the optical disk drive and read/write apparatus provided in accordance with the first aspect of the present invention are disposed at the equiangular intervals on the circle so as not to spatially interfere with each other, the time which it takes for the apparatus to perform the erasure, recording and reproduction of data from and in the disk is shortened. Since the four optical heads provided with control circuits independent of each other are collectively regulated by a controller depending on the contents of the data, the operation of the apparatus can be optimized depending on the conditions of use thereof.

Each of the four optical heads is dividedly made of a movable optical system of low weight and a fixed optical system so that the seek time of the apparatus is shortened. If the four optical heads are disposed on the diagonals of the quadrangular body of the apparatus, the fixed optical systems of the heads are located at the four corners of the body outside the periphery of the optical disk so that the space occupied by the entire apparatus is economized.

In the large-sized bias magnet device provide in accordance with the second aspect of the present invention, the permanent magnets each made of the rare-earth element and relatively small in axial length are coupled to each other in the axial, direction thereof and held by the reinforcing member to compose the device capable of applying a strong magnetic field to the data storage surface of the magneto-optical disk of large diameter over the radial width of the surface.

The graduations of the linear scale of the device provided in accordance with the third aspect of the present invention are read by the position detector so that positional information is fed back from the detector to the linear motor. For that reason, the movable portion of the optical head can be directly positioned at the aimed track of the disk without reading track information from the disk during the movement of the movable portion. Therefore, the aimed track can be rapidly sought by the apparatus.

Since the pitch of the graduations of the linear scale is equal to that of the tracks of the optical disk or to the product of the latter pitch and the reciprocal of the integer, the movable portion of the optical head can be always accurately positioned downright under or over the aimed track of the disk on the basis of positioning information from the linear scale in a short time.

In the optical disk drive an read/write apparatus provided in accordance with the fourth and fifth aspect of the present invention, the plural optical heads are disposed at each side of the optical disk, and have equiangular intervals along the circumference of the disk so as not to spatially interfere with each other. As a result, the time which it takes for the apparatus to erase, record and reproduce data is much shorter than that for the conventional drive and read/write apparatus including only one optical head.

Besides, the apparatus can erase, record and reproduce data from and in the optical disk on both the sides thereof simultaneously through the optical heads disposed at the sides.

When the movable optical system of the optical head provided in accordance with the sixth aspect the present invention tilts by the angle of the pitching motion of the carriage during the movement of the system, the pentaprism and the objective lens of the system also tilt by the same angle. However, since the pentaprism functions so that the incident light thereto is always bent by an angle of 90 degrees through the prism, the laser beam emitted from the fixed optical system to the movable one is irradiated upon the surface of the optical disk through the head always perpendicularly to the surface.

BRIEF DESCRIPTION OF THE DRAWINGS

FIG. 5 is a front view of a bias magnet device which is a second embodiment of the present invention.

FIG. 6 is a sectional view of the device along lines VI—VI shown in FIG. 5.

FIG. 7 is a schematic view of a magneto-optical disk device and read/write apparatus including the device.

FIG. 8 is a cross-sectional view of a bias magnet device which is a modification of the former device.

DETAILED DESCRIPTION OF THE PREFERRED EMBODIMENTS

Embodiments of the present invention is hereinafter described with reference to the drawings attached hereto.

Figure 1:
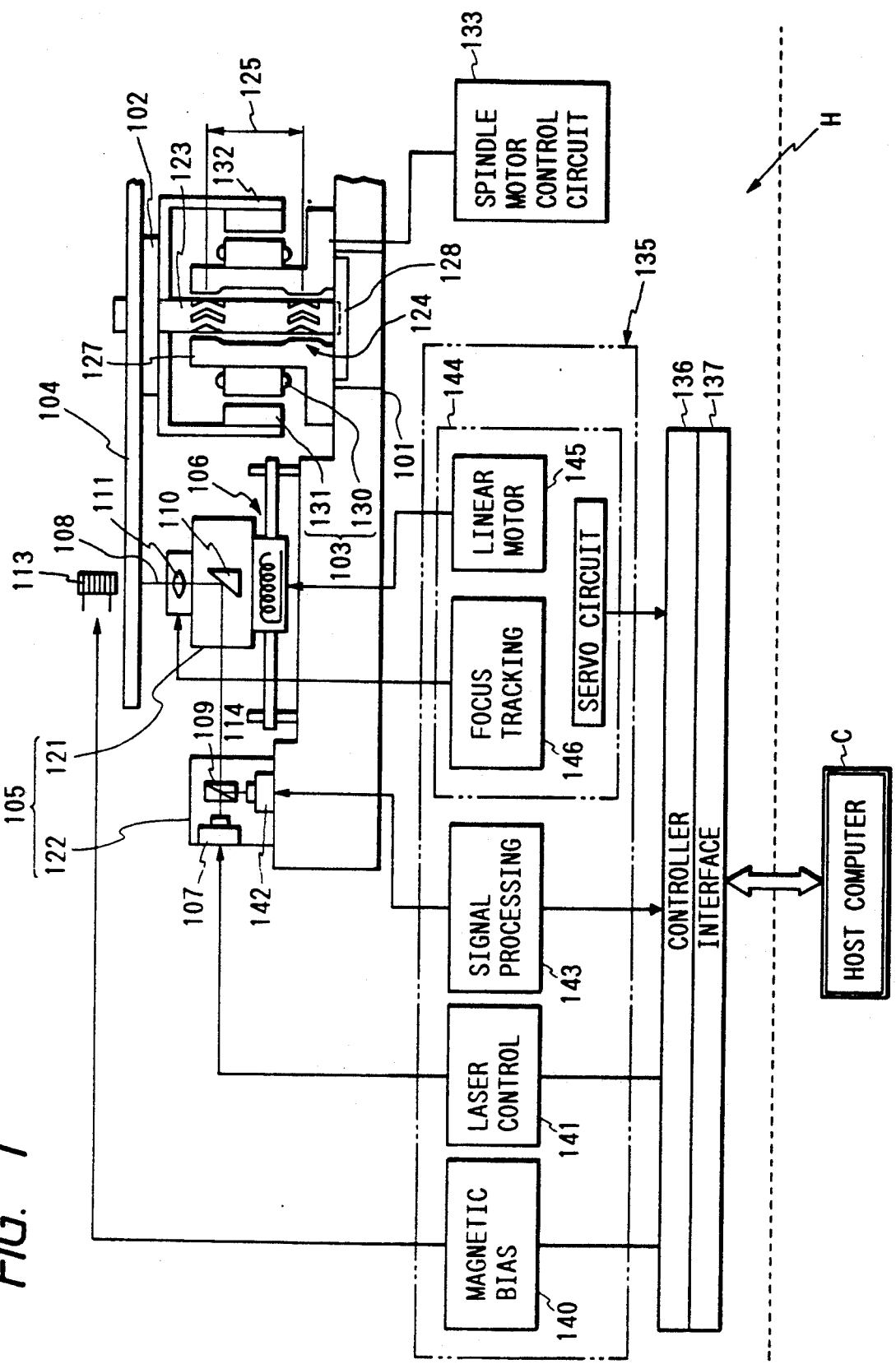
FIG. 1 is a schematic view of a major part of an optical disk drive and read/write apparatus which is a first embodiment of the present invention.
Figure 2:
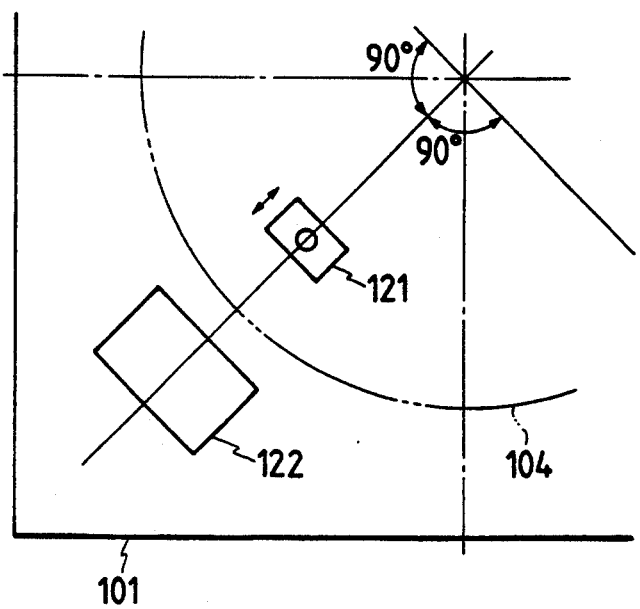
FIG. 2 is a partial plan view of the apparatus to illustrate the disposition of the optical heads of the apparatus.

FIG. 1 is a schematic view of a major part of an optical disk drive and read/write apparatus H which is a first embodiment. FIG. 2 is a partial plan view of the apparatus H to illustrate the disposition of the optical heads 105 thereof.

The optical heads 105 are provided with control circuits 135 independent of each other, and are movably supported by the housing 101 of the apparatus H. The heads 105 are disposed on a circle so that four virtual straight lines extending from the heads toward the axis of rotation of an optical disk (or magneto-optical disk) 104 have equiangular intervals of about 90 degrees in central angle. If the number of the optical heads 105 were increased, the apparatus. H would be shortened in access time and heightened in data transfer speed. However, since the heads 105 need to be moved to be opposed to the innermost edge of the data storage portion of the disk 104, the number of the heads is limited to at most four in order to prevent the heads from dimensionally interfering with each other.

Each of the four optical heads 105 is dividedly made of a movable optical system 121 and a fixed optical system 122. The movable optical system 121 is small enough in weight to be rapidly moved by a linear motor 106 to shorten the seek time of the apparatus H. The movable optical system 121 is mounted on the linear motor 106, and movably supported by the housing 101. The movable optical system 121 includes a prism 110, and an object lens 111. The fixed optical system 122 includes a semiconductor laser module 107, and a polarized beam splitter 109, and is relatively large in weight, and secured to the housing 101. It is preferable that the fixed optical systems 122 of the four optical heads 105 are disposed on the diagonals of the quadrangular base of the housing 101 at the four corners thereof, as shown in FIG. 2, in order to economize the space in the apparatus H to make it compact as a whole. The fixed optical systems 122 may be disposed between the diagonals as far as the optical heads 105 are located at equiangular intervals of about 90 degrees in central angle to avoid interfering with each other. If the base of the housing 101 is oblong in form, it is preferable that the fixed optical systems 122 of the four optical heads 105 are disposed not on the diagonals of the base but near the four corners thereof.

A shaft 123 supporting a turntable 102 for rotating the optical disk 104 is supported with two radial bearings 124 having dynamic pressure generation herringbone grooves in the peripheral surface of the shaft. The distance 125 between the centers of the bearings 124 is set to be larger than one-fifteenth of the outside diameter of the disk 104 in order to keep the length of the vertical movement of the peripheral edge of the disk within the limits of ±100 μm, within which it is easy to subject the optical heads 105 to servo focusing control. The shaft 123 is supported on the peripheral surface thereof by a cylindrical holder 127 secured to the base of the housing 101 and disposed out of contact with the shaft, and is supported on the lower end of the shaft by a thrust bearing 128 having dynamic pressure generation grooves in the bearing surface of the base.

The motor 103 of the apparatus H includes a stator coil 130 provided on the cylindrical peripheral surface of the body of the holder 127, rotor magnets 131 facing the coil, and a cup-shaped rotor 132 secured to the turntable 102. The application of electricity to the stator coil 130 is regulated by a spindle motor control circuit 133 to rotate the turntable 102 and the optical disk 104 at a precise speed depending on the erasure, recording or reproduction of data from or in the disk through the optical heads 105. In the regulation, the wave form of a signal read from the disk 104 through the optical head 105 is shaped into a digital one, and the difference between the timing of the digital wave form and that of the wave form of a reference signal is made zero.

The apparatus H includes a controller 136 for the collective optimal regulation of the mutually-independent control circuits 135 for the four optical heads 105. The controller 136 is connected to a host computer C through an interface 137 so that the assembly of the apparatus H and the optical disk 104 can be used as an external storage unit large in capacity and high in access speed and data transfer speed.

Each of the head control circuits 135 includes a magnetic bias control circuit 140, a laser control circuit 141, a signal processing circuit 143, and an optical system control circuit 144, similarly to the conventional drive and read/write apparatus. The magnetic bias control circuit 140 is for reversing the direction of the magnetic field of the bias magnet 113 of the apparatus H at the time of the change of the recording of data to the erasure of data and vice versa. The laser control circuit 141 is for setting the output from the semiconductor laser module 107 at a high level for each of erasure and recording or at a low level for reproduction, and for performing control in an optical modulation procedure depending on recorded data at the time of the recording. The signal processing circuit 143 reads a signal generated by an optical signal detector 142 having received light reflected by the disk 104 and transmitted to the detector through the polarized beam splitter 109 at the time of reproduction of data, converts the read signal into a reproduced signal corresponding to the direction of a magnetic signal recorded in the disk, and sends out the reproduced signal. A focusing error signal detected in a conventional astigmatism procedure not illustrated in the drawings, and a tracking error signal detected in a conventional three-spot procedure not illustrated in the drawings are converted into electric signals by the signal processing circuit 143 which sends out the electric signals. The optical system control circuit 144 regulates the operation of the movable optical system 121 so that the laser beam projected from the optical head 105 to the optical disk 104 makes a spot precisely in a prescribed position on the disk.

The optical system control circuit 144, which regulates the operation of the movable optical system 121 to cause the projected spot of the laser beam from the optical head 105 to precisely reach a prescribed position on the optical disk 104, includes a servo drive circuit 145 for the linear motor 106 for rapidly and roughly moving the movable optical system 121 along the radial direction of the disk, and a focusing/tracking servo circuit 146 by which the feedback control of an objective lens actuator which is not shown in the drawings and is a two-axis actuator for finely moving the objective lens 111 vertically and horizontally is performed on the basis of the focusing error signal and the tracking error signal to project the laser beam precisely to the prescribed position on the disk.

The controller 136 mediates the sending and reception of signals between the signal processing circuit 143 and the focusing/tracking servo circuit 146, and those of signals between the host computer C and the control circuits 140, 141, 143 and 144, and collectively regulate the optical head control circuits 135 in connection with each other. The controller 136 can select bach of plural collective regulation modes P1, P2, P3 and P4.

In the mode P1 typical of all the modes, the data storage portion of the optical disk 104 is divided into four areas adjacent to each other in the radial direction of the disk, and the four optical heads 105 are allocated to the areas, respectively, to perform the erasure, recording and reproduction of data from and in the areas independently of each other. The erasure and recording are performed in two rounds of rotation of the disk 104. The erasure, recording and reproduction can be performed from and in the four areas simultaneously.

In the mode P2, the data storage portion of the disk 104 is divided into two areas adjacent to each other in the radial direction of the disk, and the erasure, recording and reproduction of data are performed from and in the areas independently of each other through two optical heads 105 for the reproduction and recording and the other two optical heads 105 for the erasure. The erasure and recording are performed in one round of rotation of the disk 104. The erasure, recording and reproduction can be performed from and in the two areas simultaneously.

In the mode P3, the erasure, recording and reproduction of data are performed through each of three optical heads 105, and the other optical head 105 is prepared as a backup. The erasure and recording are performed in one round of rotation of the disk 104.

In the mode P4, the four optical heads 105 can be freely moved between the innermost and outermost edges of the data storage portion of the optical disk 104 along the radial direction thereof to perform the erasure, recording and reproduction of data from and in the disk through the heads independently of each other.

The optimal one of the regulation modes P1, P2, P3 and P4 can be selected depending on the data to be handled. For the selection, control circuits for the modes may be provided in the apparatus H in advance so as to be changed for each other by a command from the host computer C or by a manual switch, or control boards for the modes may be prepared in advance so as to be interchangeably inserted into the apparatus as occasion demands.

Figure 3:
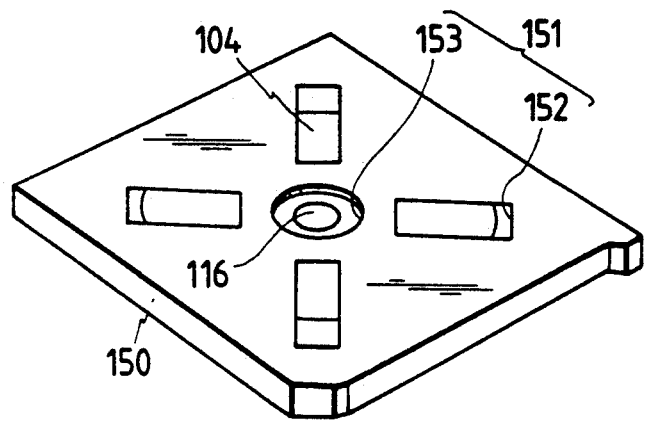
FIG. 3 is a perspective view of a cassette housing an optical disk to erase, record and reproduce data from and in the disk by the apparatus.
Figure 4:
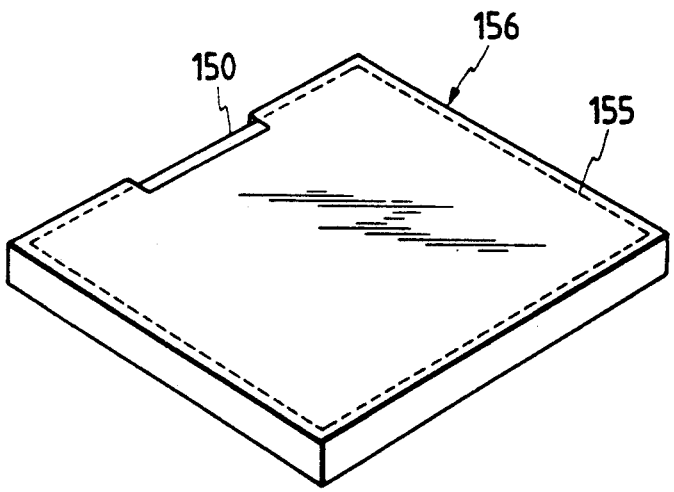
FIG. 4 is a perspective view of a casing in which the cassette housing the disk is accommodated.

A disk and case unit 156, which is used for the four-head drive and read/write apparatus H, is described with reference to FIGS. 3 and 4 from now on. If the disk 104 has two data storage portions on only one side of the disk, one side of a cassette 150 which the disk is rotatably housed has openings 151 which are four passages 152, and a center hole 153 corresponding to a hub 116 for clamping the disk to the turntable 102, and another side of the cassette has openings 151 which are four passages. The four passages 152 of the former side of the cassette 150 are radially disposed on four virtual straight lines extending to the axis of rotation of the disk 104 in the radial direction thereof and having equiangular intervals of about 90 degrees in central angle, and correspond to the ranges of movement of the four optical heads 105. The four passages of the latter side of the cassette 150 are radially disposed at equiangular intervals of about 90 degrees in central angle so as to be opposed to the bias magnets 113. If the disk 104 has the data storage portions on both the sides of the disk, each of the above-mentioned sides of the cassette 150 has openings 151 which are four such passages 152 radially disposed at equiangular intervals of about 90 degrees in central angle, and such a center hole 153. The passage 152 and center hole 153 of each of the sides may be either separate from each other, or continuous to each other. Since the openings 151 of each of the sides of the cassette 150 are plural in number, it is difficult in terms of space to provide the cassette with a shutter for opening and closing the openings. For that reason, when the disk 104 is not in use, the cassette 150 is put in a casing 155 to close the openings 151. The casing 155 is shaped as a flat box, and has a cassette insert/takeout opening in only one minor side of the casing. The disk 104, the cassette 150 and the casing 155 constitute the disk and case unit 156 so as to prevent dust or the like from entering to the surface of the disk during the nonuse thereof, and to reduce the possibility of putting a hand in contact with the data storage surface of the disk at the time of loading and unloading thereof to and from the apparatus H.

The operation of the apparatus H and that of the disk and case unit 156 are descried from now on. The cassette 150 housing the optical disk 104 is taken out from the casing 155, and put in the loading mechanism of the apparatus H. As a result, the cassette 150 is unrotatably supported by the housing 101, and the hub 116 of the disk 104 is clamped to the turntable 102. One of the collective regulation modes P1, P2, P3 and P4 is then selected. For example, the mode P1 is selected by manipulating the switch or inserting the corresponding control board into the apparatus H. As a result, the controller 136 sends out a command to write data from the host computer C into a prescribed area of the data storage portion of the disk 104 or to read data from a prescribed area of the portion and send the data to the computer. For example, the prescribed area is the innermost one.

The controller 136 then sends out a writing command signal or a reading command signal to the control circuit 135 for the optical head 105 put in charge of the prescribed area which is the innermost one. Since the range of the movement of the movable optical system 121 of the head corresponds to only the innermost area which is one of the four areas of the data storage portion, the seek time of the apparatus H is about one quarter of that of the conventional apparatus. This is true even if the area is the outermost or the intermediate one. Since what is moved by the linear motor 106 is only the movable optical system 121 of low weight, it can be rapidly moved. Besides, the controller 136 can send out commands to regulate the four optical heads 105 independently of each other for the four areas so as to perform the erasure, recording and reproduction of data.

Thus, the time of the erasure, recording and reproduction of data is made much shorter than that in the case that the erasure, recording and reproduction of data are performed through a single optical head. In other words, the apparatus H is much shortened in access time and much heightened in data transfer speed.

If the collective regulation mode P2 is selected, the controller 136 sends out a recording command and a reproduction command to two of the four optical heads 105 and an erasure command to the other two of them so that one head for recording and reproduction and another head for erasure constitute a pair, and yet another head for recording and reproduction and yet another head for erasure constitute another pair. The data storage portion of the disk 104 is divided into an inner and an outer areas adjacent to each other in the radial direction of the disk. The pairs of the heads 105 are allocated to the inner and the outer areas, respectively. The controller 136 commands the head control circuits 136 on the basis of a signal from a host computer C to perform the erasure, recording and reproduction of data from and in the areas independently of each other. As a result, the erasure and recording can be performed in one round of rotation of the disk 104, and the erasure, recording and reproduction can be performed from and in the two areas simultaneously. For that reason, the apparatus H is shortened in access time and heightened in data transfer speed.

If the collective regulation mode P3 is selected, the controller 136 sends out an erasure command to the head control circuit 135 for one optical head 105, a recording command to that for another optical head 105, and a reproduction command to that for yet another optical head 105, on the basis of a signal from the host computer C. Yet another optical head 105 is prepared as a backup in case the former head develops a trouble. Since the erasure and recording of data are performed in one round of rotation of the disk 104, the apparatus H is shortened in access time and heightened in data transfer speed.

If the collective regulation mode P4 is selected, the controller 136 commands the four optical heads 105 on the basis of a signal from the host computer C to perform the erasure, recording and reproduction of data from and in the optical disk 104 through the heads independently of each other. For that reason, the apparatus H is about four times shorter in access time and about four times higher in data transfer speed that the conventional apparatus which performs the erasure, recording and reproduction of data through only one optical head.

The apparatus H is thus made much higher in access speed and data transfer speed than the conventional apparatus. Besides, since the four optical heads 105 are regulated independently of each other, the apparatus H can properly function even if three of the heads are defective. Therefore, the reliability of the apparatus H as a storage unit is high.

When the apparatus H is used as a video disk recorder, data can be freely read through two optical heads 105 along with the recording of data through the other two optical heads 105, independently of the recording, to perform repeated or slow playback without suspending the recording of pictures.

Since the distance between the centers of the two radial bearings 124 having the dynamic pressure generating grooves and supporting the shaft 123 carrying the optical disk 104 is set to be more than one fifteenth of the outside diameter of the disk, the moment rigidity of the bearings is so high that the vertical movement of the peripheral edge of the disk can be kept within the limits of $\pm 100\mu$, within which it is easy to subject the optical heads 105 to the servo focusing control. During the rated rotation of the shaft 123, it hardly undergoes a high-frequency vibration due to an irrotational synchronous component, so that data can be rapidly sought through the optical heads 105, and the following property of the heads is heightened. Therefore, the apparatus H is high in data transfer speed, and the errors in the reading of data by the apparatus are reduced.

The four rod-like bias magnets 113 of the apparatus H are disposed at equiangular intervals on a circle so as to be opposed to the four optical heads 105 across the optical disk 104. However, instead of the heads 105 and the magnets 113, magneto-optical head units including magnets for external magnetic fields may be provided. Such units may be provided at both the sides of an optical disk having data storage portions on both the sides and housed in a cassette having four passage openings in each of the upper and lower sides of the cassette.

The semiconductor laser module 107 may be either one which emits a single laser beam, or one which emits a plurality of laser beams such as three, four or eight beams. If a plurality of laser beams are emitted by the laser module 107 of each of the four optical heads 105, the apparatus H is more heightened in data transfer speed.

The present invention may also be embodied as a magneto-optical disk drive and read/write apparatus having a direct writing function to perform erasure and recording at the same time, an optical disk drive and read/write apparatus for a phase-changed optical disk, or the like. Besides, instead of the collective regulation modes P1, P2, P3 and P4, other collective regulation modes may be set in software of the controller 136.

A second embodiment of the present invention is hereafter described with reference to the drawings attached hereto.

FIG. 5 is a front of a bias magnet device which is the embodiment. FIG. 6 is a sectional view of the device along lines VI—VI shown in FIG. 5. The device 214 includes two permanent magnets 215 each made of a rare-earth element and shaped as a quadrangular prism. The magnets 215 are butted to each other in the axial direction thereof at the ends of them to form a single bar magnet, and are surrounded held by a reinforcing member 217 made of a synthetic resin and shaped as a tube of quadrangular cross section. The member 217 is supported at both the ends thereof by quadrangular support blocks 218 made of a synthetic resin. Shafts 216 project outward from the blocks 218 in the axial direction of the bar magnet. The magnet 215, the reinforcing member 217, the blocks 218 and the shafts 206 constitute the movable part 219 of the device 214. The movable part 219 slenderly extends in the axial direction thereof as whole. The inertia of the part 219 needs to be small enough to quickly turn it over. It is preferable that the reinforcing member 217 and the blocks 218 are made of a nonmagnetic substance not to affect the bias magnetic field of the magnets 215 surrounded by the member and the blocks. For examples, the member 217 and the blocks 218 are made of a synthetic resin or an aluminum alloy, each of which is a nonmagnetic substance of small specific gravity.

The reinforcing member 217 is conjoined to the support blocks 218 by an adhesive, or the member and the blocks are integrally modes of the synthetic resin. The permanent magnets 215 are conjoined to each other and to the member 217 and the blocks 218 by an adhesive. The member 217 may be either a single monolithic piece, or an assembly of plural pieces second together.

The shafts 206 at both the ends of the movable part are rotatably attached to the case 221 of the device with ball bearings 220 on pillow blocks or the like. A coil 211 for turning the movable part 219 over is attached to the case 221 neat central portion of the part, and faces the portion.

FIG. 7 is a schematic view of a magneto-optical disk drive and read/write apparatus including the bias magnet device 214.

In the apparatus, a motor 244 for rotating a turntable 232 at a prescribed speed is provided on the base of a housing 231 so that the magneto-optical disk 202 loaded on the turntable can be rotated at a precise speed by the motor. An optical head 203 is moved to a prescribed position at the disk 202 by a linear motor 236 in order to erase, record or reproduce data from or in the disk.

To record or write data in the disk 202, a light beam 238 is horizontally emitted from a semiconductor laser module 237, transmitted through a polarized beam spitter 239, diverted upward by a prism 240, and concentrated to the position of the recording or writing of the data in the disk through an objective lens 241, to heat the beam-irradiated portion of the disk above the Curie temperature thereof by the spot of the beam thereon to magnetize the portion in the direction of the magnetic field of the permanent magnets 215 of the bias magnet device 214 to erase existing data from the portion. By the time the disk 202 is thereafter rotated by another round to have the same positional relationship with the optical head 203 and the magnet device 214 as at the time of the erasure, electricity is applied to the coil 211 of the device to turn the bias magnets 215 over select a direction for the magnetic field of the magnets depending on the direction of magnetization of the, portion of the disk 202 for the new data. The portion is then heated again by the spot of the beam thereon so as to be magnetized in the selected direction of the magnetic field of the magnets 215 to record or write the new data in the portion.

To reproduce or read data from the disk 202, the intensity of the light beam 238 is made lower than that at the time of the recording or writing, to heat the beam-irradiated portion of the disk below the Curie temperature thereof, and the optical head 203 is moved to be opposed to the recorded position of the data in the disk to irradiate the light beam upon the portion. At that time, the direction of rotation of the plane of polarization of disk-reflected light changes depending on the direction of magnetization of the magneto-optical film of the beam-irradiated portion. The changed direction of rotation of the plane of polarization is detected to reproduce or read the data.

The operation of the bias magnet device 214 is described in detail from now on. The movable part 219 of the device 214 includes the two permanent magnets 215 made of the rare-earth element and having a relatively-small axial length each. The magnets 215 are held by the reinforcing member 217 and coupled together in the axial direction of the magnets to form single bar magnet whose axial length is large enough to apply a strong magnetic field to the disk 202 over the radial width of the data storage surface of the disk even if the diameter of the disk is as large 300 mm.

Since the reinforcing member 217 and the support blocks 218 are made of the low-specific-gravity substance such as the synthetic resin and the aluminum alloy, the movable part 219 is so small in weight and inertia that the part can be quickly turned over by applying the electricity to the coil 11 of the device 214, to invert the magnets 215 to reverse the direction of the bias magnetic field thereof.

Since the movable part 219 is supported at both the ends thereof with the ball bearings 220, the resistance to the turning-over of the part is much lower than that with conventional plain bearings, to make it possible to increase the speed of the reversing of the direction of the bias magnetic field.

Thus, the restrictions on the magnetizability of the magneto-optical disk 202 are not only reduced, but also the access times of the magneto-optical disk and read/write apparatus is shortened.

FIG. 8 is a cross-sectional view of a movable part 219 which is a modification of that of the bias magnet device 214. In the modification, a plurality of permanent magnets 215 are held by oblongly-shaped reinforcing members 217 conjoined to both the sides of the magnets by an adhesive. For that reason, the movable part 219 is less in weight than the preceding one 219 in which the permanent magnets 215 are surrounded by the reinforcing members 227 along the total circumference thereof. As a result, the inertia of the part 219 is more reduced. It is preferable but not essential that the reinforcing member 217 and support blocks 218 of the part 219 are made of a nonmagnetic substance.

A third embodiment of the present invention is hereafter described with reference to the drawings attached hereto.

Figure 9:
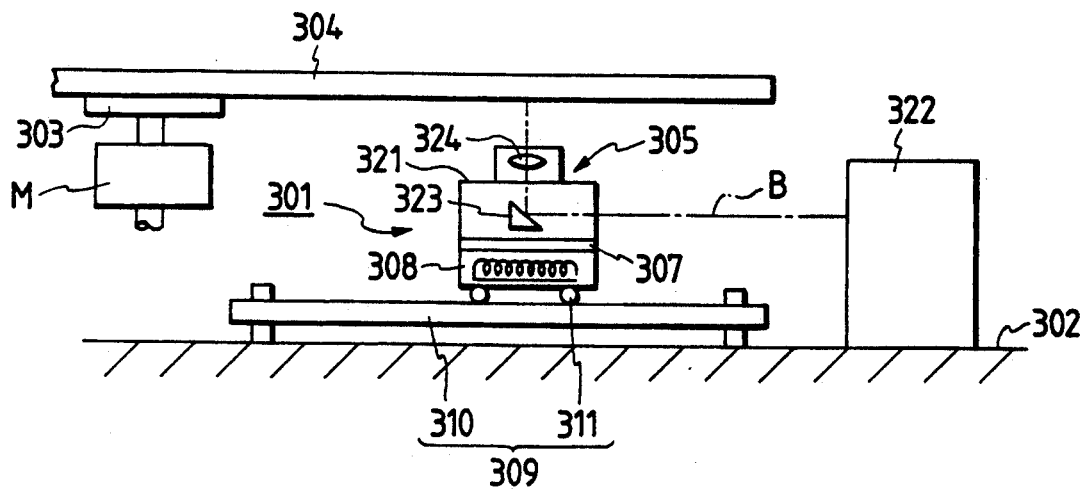
FIG. 9 is a side view of a major part of an optical head positioning device which is a third embodiment of the present invention.
Figure 10:
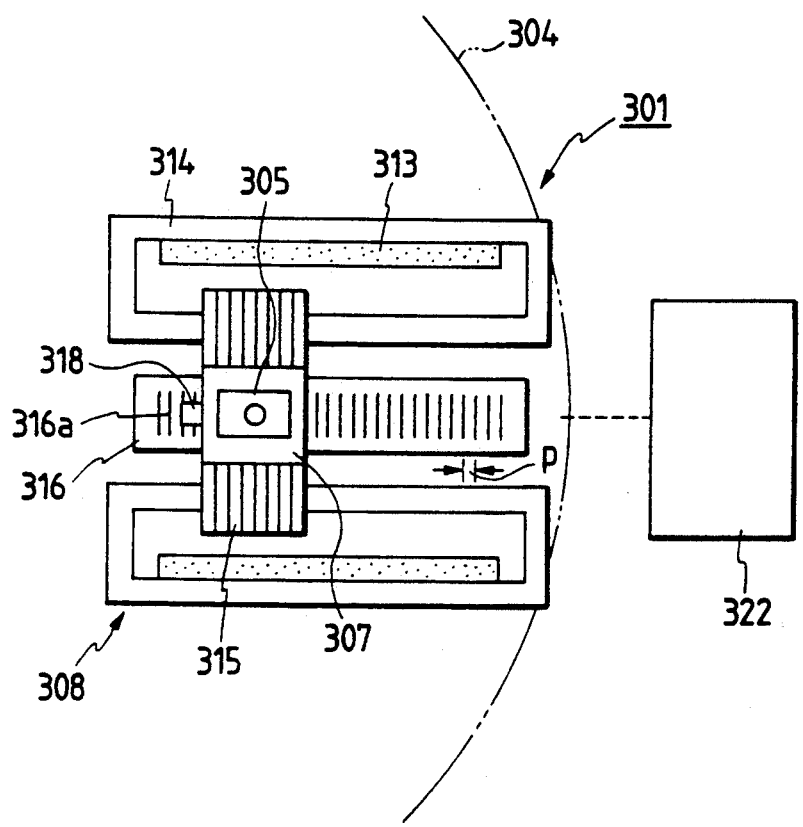
FIG. 10 is a plan view of the part.

FIG. 9 is a side view of an optical head positioning device which is the embodiment. FIG. 10 is a plan view of the device. The device 301 is provided on the housing 302 of an optical disk drive and read/write apparatus so that the device is located under an optical disk 304 clamped to the turntable 303 of the apparatus. Shown at M in FIG. 9 is a motor for rotating the turntable 303.

The positioning device 301 includes a carriage 307 on which the optical head 305 to be positioned by the device is mounted, a linear motor 308 for horizontally moving the carriage, and a straight guide mechanism 309 for guiding the carriage for the movement. The guide mechanism 309 includes guide members 310 provided on the housing 302 and extending in parallel with each other, and bearings 311 which are smoothly moved along the radial direction of the optical disk 304 while being guided by the members. The mechanism 309 is a conventional one to prevent the carriage 307 from playing perpendicularly to the direction of the movement thereof during it.

The linear motor 308 is a DC linear motor, and has stators made of field systems including permanent magnets 313 and yokes 314, and a movable coil 315 disposed between the mutually facing sides of the systems, as shown in FIG. 10. The linear motor 308 may be another one such as an induction linear motor, a synchronous linear motor, a pulse linear motor, and a hybrid linear motor.

The linear motor 308 is provided with a linear scale 316 as a straight position detecting means for finding out the moved position of the coil 315 to control the positioning of the optical head 305. To accurately perform the control, an optical linear encoder is used, for example. The pitch p of the slit graduations or reflective graduations 316a of the linear scale 316 extending along the range of the movement of the linear motor 308 is equal to that of the tracks of the optical disk 304 or to the product of the latter pitch and the reciprocal of an integer. A position detector 318, which reads the graduations 316a, is mounted on the coil 315. The light reception element of the detector 318 receives light transmitted through the graduation 316a or reflected by it, so that the element sends out a position signal. If a linear encoder of the semiconductor laser type is used, it is possible that the pitch p of the graduations 316a is set at 1.6 $\mu$m to be equal to that of the tracks of the disk 304, and the light reception element sends out a position signal corresponding to a length of 0.4 $\mu$m which is a quarter of the pitch.

Instead of the optical linear encoder, a magnetic linear encoder may be used. For the use, a linear scale made of a magnetic film magnetized at prescribed intervals to have graduations, and a magnetic head of the magnetic flux response type are provided instead of the linear scale 316 and the position detector 318.

The optical head 305 is dividedly made of a movable optical system 321 and a fixed optical system 322 so that the load upon the linear motor 308 is reduced to shorten the seek time of the apparatus. The movable optical system 321 includes a prism 323, and an objective lens 324 supported so that it can be vertically and horizontally moved by a two-axis actuator. The movable optical system 321 is mounted on the carriage 307. The fixed optical system 322 includes relatively heavy components such as a semiconductor laser module and a polarized beam splitter which are not shown in the drawings. The carriage 307 is guided by the guide members 310 on the portions of the carriage at both the sides of the linear scale 316, and at two or more points having a distance from each other along the radial direction of the disk 304 and set for each of the portions.

The linear scale 316 is located downright under the movable optical system 321 of the head 305 mounted on the carriage 307, or downright under the objective lens 324 of the system, to be exact.

When data recorded in the optical disk 304 is to be erased by the optical disk drive and read/write apparatus including the optical head positioning device 301, a light beam B is horizontally emitted from the semiconductor laser module of the fixed optical system 322, transmitted to the movable optical system 321 through the polarized beam splitter, diverted upward by the prism 323, and concentrated to the recorded position of the data through the objective lens 324 to heat the beam-irradiate portion of the disk above the Curie temperature thereof by the spot of the beam on the portion to erase the data by the magnetic field of a bias magnet not shown in the drawings. When new data is thereafter to be recorded in the portion of the disk 304, a direction is selected from the magnetic field of the bias magnet depending on the data. After one round of rotation of the disk 304 past the erasure, the portion of the disk is heated again by the spot of the beam thereon to record the new data in the portion. When data recorded in the disk 304 is to be read, the intensity of the laser beam B is lowered to heat the disk below the Curie temperature thereof in the recorded position of the data by the spot of the beam thereon. The direction of rotation of the plane of polarization of disk-reflected light changes depending on that of the magnetization of the magneto-optical film of the portion of the disk 304 at the time of the heating. The changed direction is detected to read the data.

An operation control circuit, which controls the operation of an optical mechanism including the optical head 305 and the head positioning device 301, includes a servo drive circuit for the linear motor 308 for rapidly and roughly moving the movable optical system 321 along the radial direction of the optical disk 304 on the basis of positional information from the linear scale 316, and a focusing/tracking servo circuit by which the two-axis actuator not shown in the drawings but provided to minutely move the objective lens 324 vertically and horizontally is subjected to feedback control on the basis of a focusing error signal and a tracking error signal to project the laser beam precisely to a prescribed position on the disk 304. The operation control circuit thus regulates the optical mechanism to irradiate the spot of the laser beam upon the disk 304 precisely in the prescribed position.

The operation of the optical disk drive and read/write apparatus is described from now on. The optical disk 304 is clamped to the turntable 303 by a loading mechanism included in the apparatus but not shown in the drawings. To write data in the prescribed area of the disk 304 or read data from the area, the movable optical system 321 of the optical head 305 is moved to a location downright under the aimed track of the area.

For the movement of the system 321, electricity is applied to the coil 315 of the linear motor 308 from a drive circuit provided for the motor but not shown in the drawings, so that the carriage 307 is straightly moved along the guide member 310. At that time, the position detector 318 mounted on the carriage 307 reads the graduations 316a of the linear scale 316, and counts the number of them. The counted number is fed back as a displacement signal to the drive circuit to which an aimed position value is applied in advance so that the number is compared with the value. A voltage applied to the coil 315 is controlled depending on the difference between the number and the value, to move the carriage 307 to an aimed position for the aimed track of the prescribed area of the disk 304. Since the pitch of the graduations 316a of the linear scale 316 is equal to that p of the tracks of the disk 304 or to the product of the latter pitch and the reciprocal of the integer, the spot of the laser beam irradiated upon the disk from the movable optical system 321 of the head 305 can be precisely and directly positioned on the aimed track. For that reason, the movable optical system 321 of the head 305 does not need to read track information from the disk 304 during the movement of the system as in the conventional positioning device, and can therefore be rapidly moved to seek the aimed track. If the pitch of the graduations 316a were not equal to that p of the tracks of the disk 304 or to the product, the movable optical system 321 could be moved to a location between the aimed track and the adjacent track so that the system needed to be moved again to a prescribed location for the aimed track.

Figure 28:
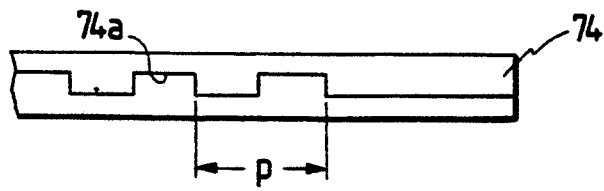
FIG. 28 is a partial sectional view of an optical disk to illustrate the lead grooves thereof.
Figure 29:
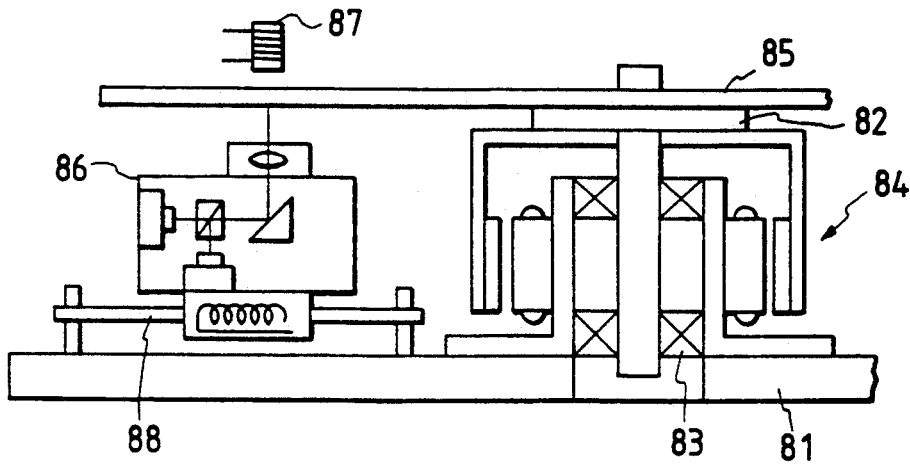
FIG. 29 is a schematic view of a major part of a conventional drive and read/write apparatus for an optical disk.
Figure 30:
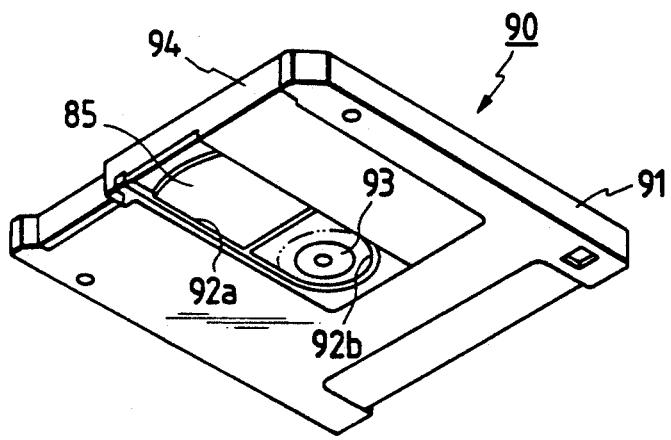
FIG. 30 is an upper perspective view of a cassette for the disk to be handled by the conventional apparatus.
Figure 31:
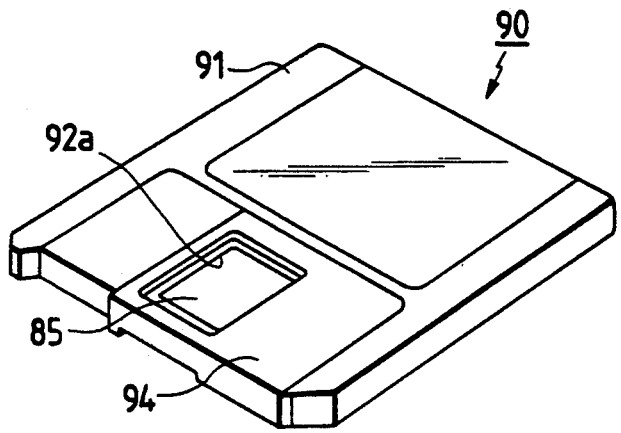
FIG. 31 is a lower perspective view of the cassette shown in FIG. 30.
Figure 32:
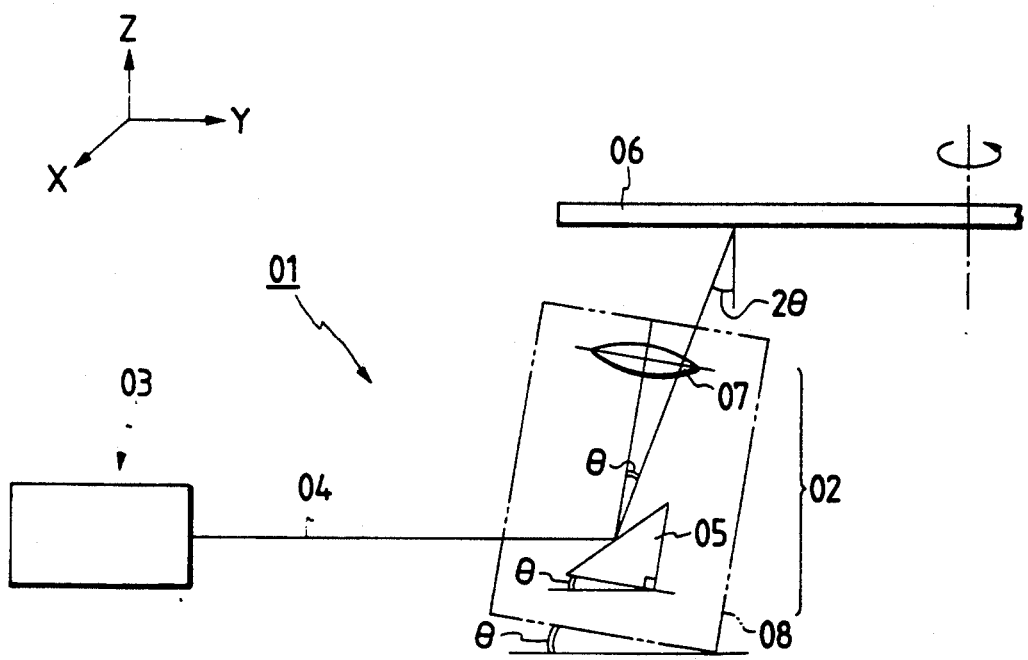
FIG. 32 is a view to illustrate the operation of a conventional optical head.

To position the head 305 at the aimed track, the positional information from the linear scale 316 and that from the lead grooves 304a in FIG. 28 of the disk 304 may be used in combination. In that case, the positional information from the linear scale 316 is used to roughly position the head in the vicinity of the aimed track, and that from the lead grooves 304a of the disk 304 is thereafter used to finely position the head at the track. In this way, the positioning of the head 305 is not affected by the eccentricity and warp of the disk 304, because the head does not need to detect track information and search the tracks of the disk until reaching the vicinity of the aimed track in the relatively-large-length movement of the head. After reaching the vicinity, the positional information from the lead grooves 304a is used to search the tracks. The seek time of the apparatus can thus be shortened.

Since the linear scale 316 is located downright under the movable optical system 321 of the head 305, the reading of the positional information from the linear scale is hardly affected by the yawing motion of the carriage 307, which is the phenomenon that the leading portion of the carriage sways rightward and leftward relative to the guide members 310 of the straight guide mechanism 309 as the carriage is moved by the linear motor 308. For that reason, the graduations 316a can be always accurately read.

After the movable optical system 321 of the head 305 is moved to the location downright under the aimed track of the optical disk 304, a writing or reading command signal is sent to an optical head control circuit to perform prescribed operation such as the erasure, recording or reproduction of data. The head 305 can thus be directly positioned at the aimed track of the disk 304 without reading the track information from the disk. For that reason, the aimed track can be sought by the device more rapidly than the conventional device to much shorten the access time of the apparatus.

Although the optical head 305 is dividedly made of the movable and the fixed optical systems 321 and 322, the systems may be integrated with each other to constitute the movable portion of the head. Although the optical head 305 is disposed under the optical disk 304 and the linear scale 316 is located under the head, the head may be disposed over the disk and the scale may be located over the head to position the head downright over the aimed track of the disk.

The present invention is not confined to the embodiment, but may be embodied as a positioning device for a phase-change disk drive and read/write apparatus or the like.

A fourth embodiment of the present invention is hereafter described with reference to FIGS. 11-13.

Figure 11:
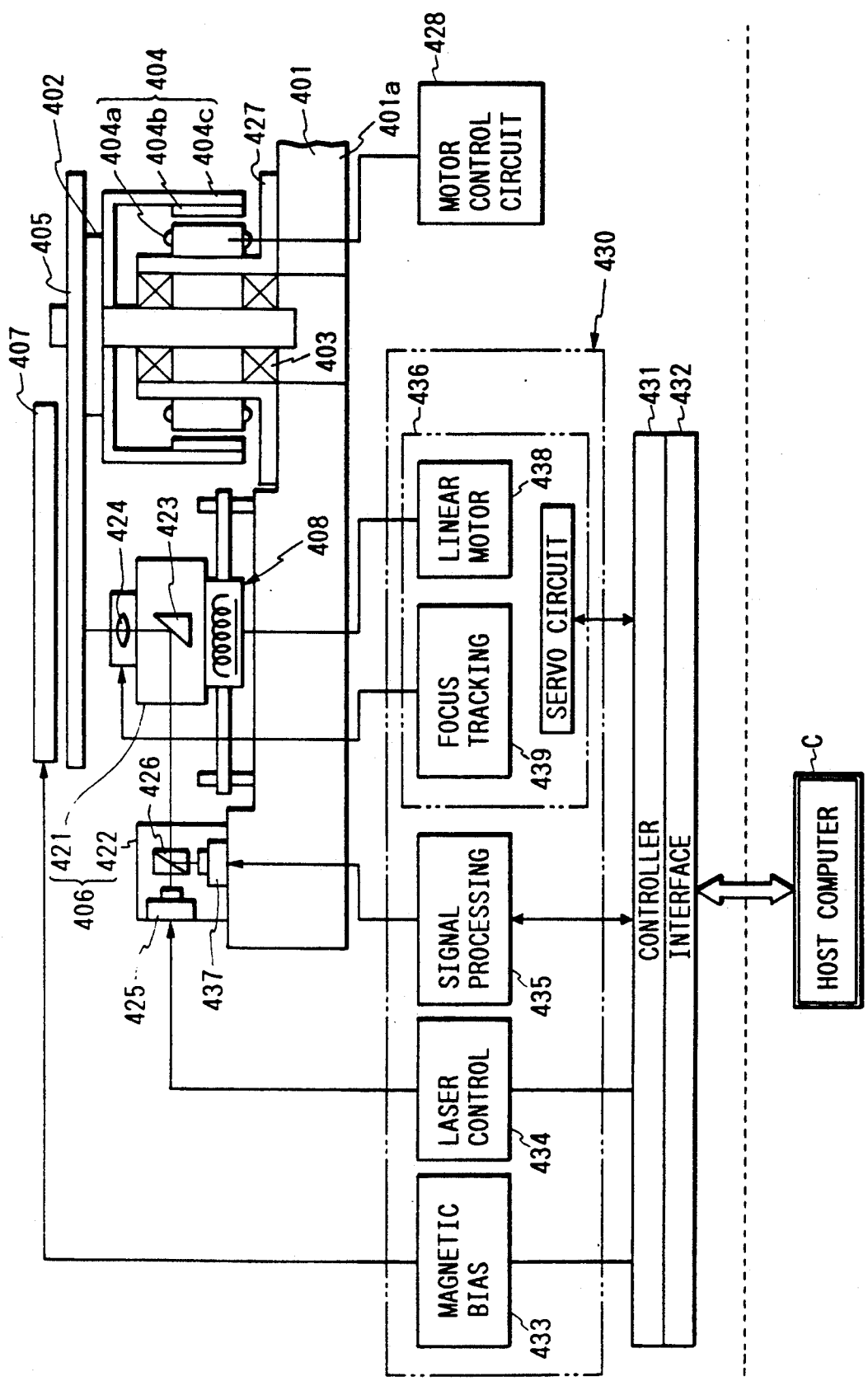
FIG. 11 is a schematic view of a major part of an optical disk drive an read/write apparatus which is a fourth embodiment of the present invention.

FIG. 11 is a schematic view of a major part of an optical disk drive and read/write apparatus which is one of the embodiments. FIG. 12 is a partial plan view of the apparatus to illustrate the disposition of the optical heads thereof.

Figure 12:
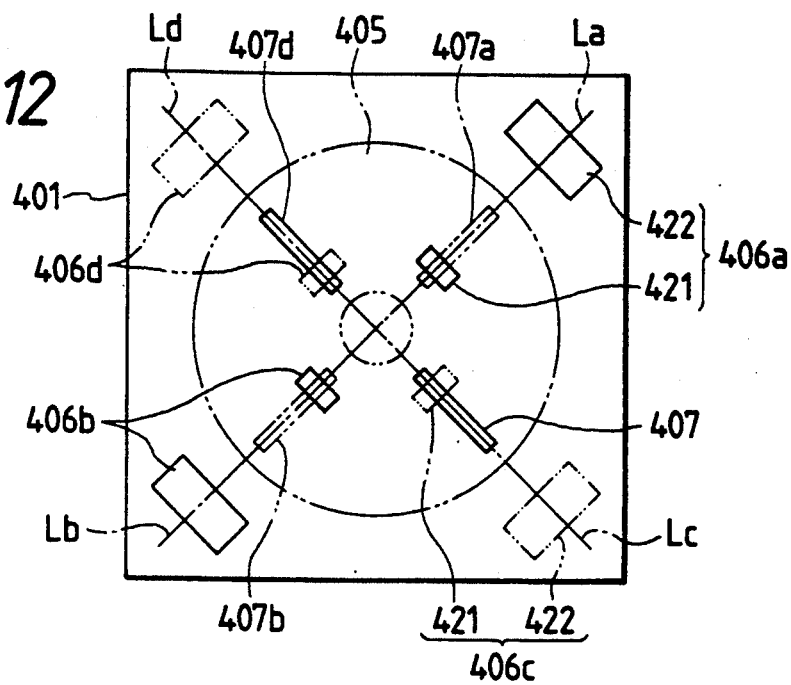
FIG. 12 is a partial plan view of the apparatus to illustrate the disposition of the optical heads thereof.
Figure 13:
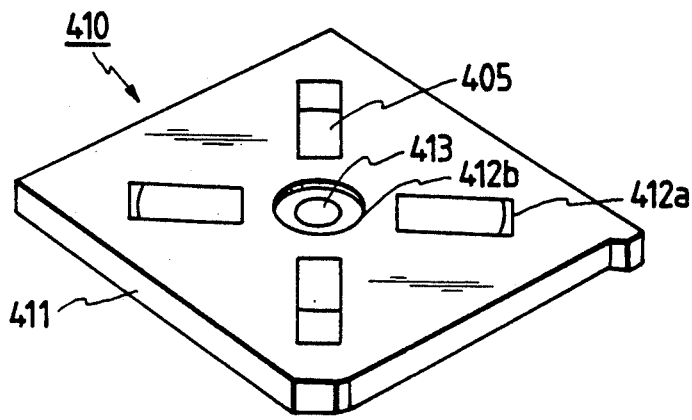
FIG. 13 is a perspective view of a cassette for an optical disk to be handled by the apparatus.

The apparatus includes the four optical heads 406, two of which are dispose to face one side A of an optical disk 405 and the other two of which are disposed to face the other sides B of the disk, as shown in FIG. 12. If the number of the optical heads 406 were increased, the apparatus would be shortened in access time and brightened in data transfer speed. However, since the movable optical system 421 of the optical heads 406 need to be moved to be opposed to the innermost edge of the data storage portion of the optical disk 405, the number of the heads for each side of the disk is set at two prevent the heads from spatially interfering with each other.

Two virtual straight lines La and Lb extending from two optical heads 406a and 406b disposed to face the side A of the optical disk 405 form mutually-equal angles of about 180 degrees on both the sides of the lines. Two virtual straight lines Ic an Id extending from the other two optical heads 406c and 406d disposed to face the other side B of the optical disk 405 form mutually-equal central angles of about 180 degrees on both the sides of the lines as well.

Rodlike bias magnets 407a, 407b, 407c and 407d are disposed to be opposed to the optical heads 406a, 406b, 406c and 406d across the disk 405. The axes of the magnets 407a and 407b corresponding to the heads 406a and 406b disposed to face the side A of the disk 405 extend in parallel with the two lines La and Lb. The axes of the other magnets 407c and 407d corresponding to the heads 406c and 406d disposed to face the other side B of the disk 405 extend in parallel with the other two lines Lc and Ld. Since the heads 406 and the magnets 407 are thus disposed alternately at both the sides of the disk 405 along the circumferential direction thereof, the heads and the magnets do not spatially interfere with each other.

Each of the optical heads 406 is dividedly made of the movable optical system 421 of relatively small weight and a fixed optical system 422 so that the movable optical system can be rapidly moved by a linear motor 408 to shorten the seek time of the apparatus. The movable optical system 421 includes a prism 424 and an objective lens 424, each of which is relatively small in weight. The movable optical system 421 is movably supported with the linear motor 408 on the case of a housing 401. The fixed optical system 422 includes a semiconductor laser module 425 and a polarized beam splitter 426, each of which is relatively large in weight. The fixed optical system 422 is second to the housing 401. The fixed optical systems 422 of the four optical hands 406a, 406b, 406c and 406d are disposed on the diagonals of the housing 401, as shown in FIG. 12, to efficiently utilize the space thereon. However, the fixed optical systems 422 may not be disposed on the diagonals but between them. If they are disposed between the diagonals, the two heads 406 for each side of the disk 405 are disposed at equiangular intervals of about 180 degrees along the circumference of the disk so as not to spatially interfere with each other.

A cylindrical holder 427 is secured to the central portion of the base 401a of the housing 401. A motor 404 for rotating a turntable 402 includes a stator coil 404a mounted on the cylindrical peripheral surface of the body of the holder 427, rotor magnets 404b facing the coil, and a cup-shaped rotor 404c secured to the magnets and the turntable 402. The application of electricity to the stator coil 404a is regulated by a motor control circuit 428 to rotate the turntable 402 and the optical disk 405 at a precise speed to erase, record or reproduce data from or in the disk 405 through the optical head 406.

The four optical heads 406 are provided with head control circuits 430 independent of each other. The apparatus includes collective controllers 431 for the collective optimal regulation of the head control circuits 430. The controller 431 is connected to a host computer C through an interface 432 so that the apparatus can be used as an external storage unit high in capacity, access speed and data transfer speed.

Each of the head control circuits 430 includes a magnetic bias control circuit 433, a laser control circuit 434, a signal processing circuit 435, and an optical system control circuit 436. The magnetic bias control circuit 433 is for reversing the direction of the magnetic field of the bias magnet 407 at the time of the change from the recording of data to the erasure of data and vice versa. The laser control circuit 434 is for setting the output from the semiconductor laser module 425 at a high level a the time of erasure or recording or at a low level at the time of reproduction, and for performing control in an optical modulation procedure depending on recording data at the time of the recording. The signal processing circuit 435 reads a signal generated by an optical signal detector 437 having received light reflected by the disk 405 and transmitted to the detector through the polarized beam splitter 426 at the time of reproduction, converts the read signal into a reproduced signal corresponding to the direction of a magnetic signal recorded in the disk, and sends out the reproduced signal. A focusing error signal detected in a conventional astigmatism procedure not illustrated in the drawings, and a tracking error signal detected in a conventional three-spot procedure not illustrated in the drawings are converted into electric signals by the signal processing circuit 435 which sends out the electric signals.

The optical system control circuit 436 regulates the operation of the movable optical system 421 and causes the projected spot of the laser beam from the optical head 406 to precisely reach a prescribed position on the optical disk 405, and includes a servo drive circuit 438 for the linear motor 408 for rapidly and roughly moving the movable optical system 421 along the radial direction of the disk, and a focusing/tracking servo circuit 439 by which the feedback control of an objective lens actuator which is not shown in the drawings and is a two-axis actuator for finely moving the objective lens 424 vertically and horizontally is performed on the basis of the focusing error signal and the tracking error signal to precisely project the beam to the prescribed position on the disk.

The controller 431 mediates the sending and reception of signals between the signal processing circuit 435 an the focusing/tracking servo circuit 439, and those of signals between the host computer C and the control circuits 433, 434, 435 and 436, and collectively regulates the optical head control circuits 430 in connection with each other on one of plural collective regulation modes. In one of the modes, one of the two optical heads 406 for each side of the optical disk 405 is used to record and reproduce data, and the other of the heads is used to erase date. In another of the modes, the data storage portion of each side of the optical disk 405 is divided into two areas adjacent to each other in the radial direction of the disk, an the two optical heads 406 for the side are allocated to the area, respectively, to record, reproduce and erase data. The controller 31 can select the optimal one of the modes, depending on the handled data, by switching a circuit provided in the controller, or interchangeably inserting a control board into it.

A disk and case unit 410, which is used for the optical disk drive and read/write apparatus, is described with reference to FIGS. 13 and 14 from now on. The unit 410 includes the optical disk 405 having a hub 413 provided in the central portions of the sides A and B of the disk so as to clap the disk to the turntable 402, a two-side-equivalent cassette 411 in which the disk is rotatably housed, and a protective casing 415. Each of the upper and lower sides of the cassette 411 has a center hole 412b provided in the central portion of the side and surrounding the hub 413 at the periphery of the hole, and four passage openings 412a provided on a circle so as to be for the two optical heads 406 and the two bias magnets 407. The passage openings 412a are locate on four virtual straight lines extending from the openings toward the axis of rotation of the disk 405 and having equiangular intervals of about 90 degrees. The center hole 412b may be either separate from the passage openings 412a, or continuous thereto.

When the disk is not in use, the cassette 411 housing the disk is put in the protective casing 415 to prevent dust or the like from entering to the disk. The disk 405 has reversely-spiral lead grooves in both the sides A and B of the disk so that the sides can be simultaneously subjected to the recording, reproduction and erasure of data in and from the disk.

The operation of the optical disk drive and read/-write apparatus is described in detail from now on. Although the cassette 411 does not have a protective shutter, the trouble of letting dust or the like enter to the optical disk 405, that of accidentally touching a hand on the data storage surface of the disk, and the like can be prevented by putting the cassette in the protective case 415. The cassette 411 housing the disk 405 is taken out of the case 415, and then put into a loading mechanism included in the apparatus but not shown in the drawings. As a result, the cassette 411 is unrotatably supported by the housing 401, and the disk 405 is clamped at the hub 413 to the turntable 402. When one of the collective regulation modes is then selected by switching the circuit or inserting the control board, a command is given to write data from three host computer C into a prescribed position in the disk 405 or read data from a prescribed position in the disk send the read data to the computer. At that time, the controller 431 sends out a writing or reading command signal to the corresponding head control circuit 430. As a result, the linear motor 408 for the head 406 is driven on the basis of the command from the controller 431 to the optical system control circuit 436 to move the movable optical system 421 of the head under feedback control so that the system is precisely opposed to the prescribed position in the disk 405. Since only the movable optical system 421 of relatively small weight is moved by the linear motor 408, the movement can be rapidly performed to shorten the apparatus in seek times or access time. This is a desirable effect.

If the collective regulation mode in which one of the two optical heads 406 for one side of the disk 405 is used to record or reproduce data therein and the other of the heads is used to erase data from the disk is selected, the controller 431 gives a recording or reproduction command for the former head and an erasure command for the latter head to use the former for the recording or reproduction and the latter for the erasure. To record new data in the side A of the disk 405, the controller 431 sends out a signal to the laser control circuit 434 for the head 406 for the erasure from the side to horizontally emit a laser beam of high output power from the semiconductor laser module 425. The laser beam is transmitted through the polarized beam splitter 426, diverted by the prism 423, and concentrated to the position of the recording of the data in the disk 405 through the objective lens 424 to heat the beam-irradiated portion of the disk above the Curie temperature thereof to magnetize the portion in the direction of the magnetic field of the bias magnet 407 disposed at the other sides B of the disk opposite the head, to erase existing data from the portion first. The disk 405 is thereafter rotated by a half round so that the data-erased portion thereof is moved to be opposed to the other head 406 for the recording or reproduction. A laser beam of high output power is then irradiated upon the data-erased portion of the disk 405 through the head 406 to heat the portion by the spot of the beam on the disk above the Curie temperature thereof to magnetize the portion in the direction of the magnetic field of the bias magnet 407 corresponding to the head and deposed opposite it to record the new data in the portion. The direction of the magnetic field of the magnet 407 for the head 406 for the recording or reproduction can be reversed depending on a data signal sent from the host computer C to the magnetic bias control circuit 433 through the controller 431.

Since the erasure of the existing data and the recording of the new data are thus performed during one round of rotation of the disk 405, the apparatus is shorter in access time and higher in data transfer speed than the conventional apparatus in which the optical disk is rotated by two rounds for such erasure and recording. This is another desirable effect.

To reproduce data from the side A of the disk 405, a laser beam of low output power is emitted from the semiconductor laser module 425 of the optical head 406 for the recording or reproduction, transmitted through the beam splitter 426 of the head, diverted by the prism 423 thereof, and concentrated to the recorded position of the data in the disk through the objected lens 424 of the head to heat the beam-irradiated portion of the disk below the Curie temperature thereof by the spot of the beam thereon. At that time, the movable optical system 421 of the head 406 is moved by the linear motor 408 so that the system is opposed to the recorded position of the data in the disk 405 to irradiate the bean upon the portion thereof. The direction of portion of the plane of polarization of disk-reflected light change depending on the direction of magnetization of the magneto-optical film of the portion of the disk 405. The disk-reflected light is transmitted to the optical signal detector 437 through the beam splitter 426 so that the output from the detector is converted into a reproduced signal by the signal processing circuit 435. The reproduced signal is sent to the host computer C. The data is thus reproduced.

Such recording, reproduction and erasure can also be preformed in and from the other side B of the disk 405 independently of those in and from the former side A thereof. For that purpose, the cassette 411 housing the disk 405 does not need to be turned over. In other words, the recording, reproduction and erasure can be performed in and from both the sides A and B of the disk simultaneously. Therefore, the time which it takes for the apparatus to perform the recording, reproduction and erasure through the four optical heads 406 is much shorter than that for the conventional apparatus which performs such recording, reproduction and erasure through only one-optical head. Because of that fact and the adoption if each optical head dividedly made of the movable optical system 421 of relatively small weight and the fixed optical system 422, the present apparatus is very much shortened in access time an very much heightened in data transfer speed in comparison with the conventional one.

Since the four optical heads 406 disposed at both the sides A and B of the optical disk 405 are provided with the control circuits 430 which are independent of each other and are collectively regulated by the controller 431 depending on the content of data to be handled by the apparatus, the operation thereof can be easily optimized depending on the conditions of use thereof. If the optical heads 406 are defective except at least one, the apparatus can function. Therefore, the apparatus is high in reliability as a storage unit.

When the apparatus is used as a video disk recorder, data can be freely read from one side of the optical disk 405 through the optical head 406 while data are being recorded in the side through the other optical head 406. For that reason, a picture can be reproduced at a normal speed or a low speed from the disk 405 by the apparatus while another picture is being recorded in the disk. Since both the sides A and B of the disk 405 can be simultaneously subjected to recording, reproduction and erasure, the apparatus is also appropriate to perform the recording, reproduction and erasure of picture, which require a high speed of data transfer.

Figure 15:
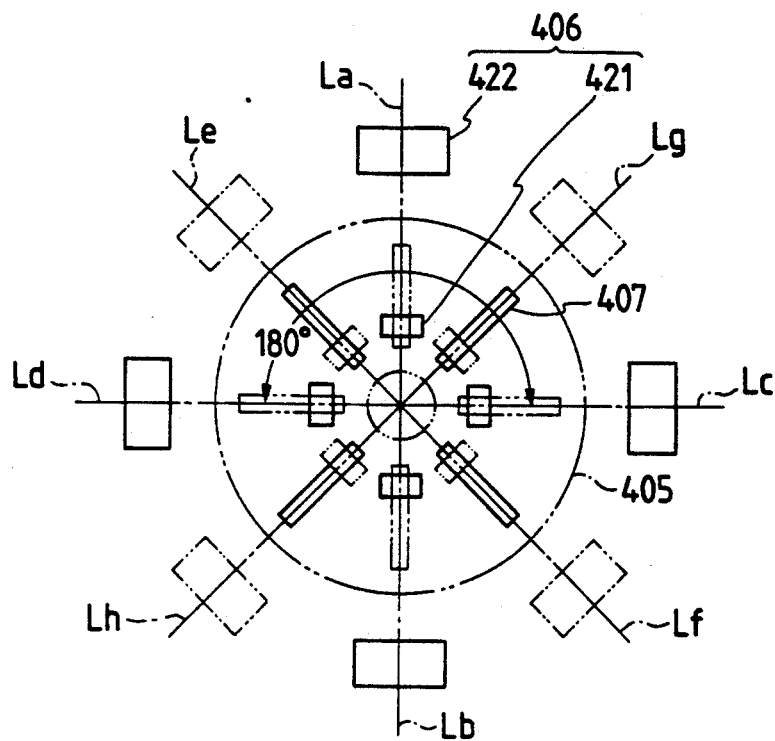
FIG. 15 is a partial plan view of an optical disk drive and read/write apparatus which is a fifth embodiment of the invention.
Figure 16:
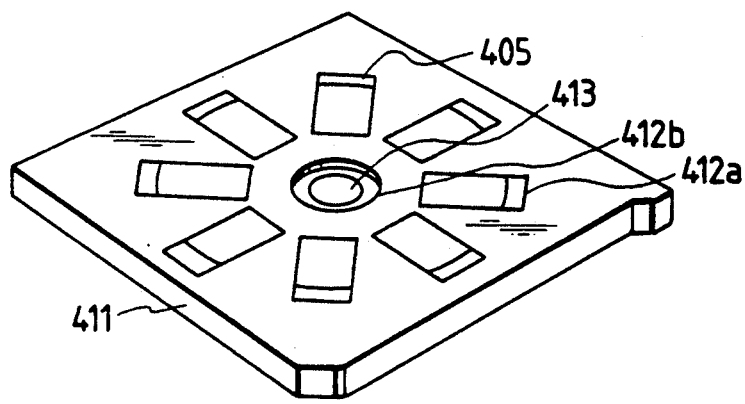
FIG. 16 is a perspective view of a cassette for an optical disk to be handled by the apparatus shown in FIG. 5.

FIGS. 15 and 16 show an optical disk drive an read/write apparatus which is a fifth embodiment. The apparatus includes eight optical heads 406, each of which is devotedly made of a movable optical system of relatively small weight and a fixed optical system. Four of the heads 406 are disposed at one side A of an optical disk 405, while the other four of the heads are deposed at the other side B of the disk. Four virtual straight lines La, Lb, Lc and Ld extending toward the axis of rotation of he disk 405 from the four optical heads 406 disposed at the side A of the disk have equiangular intervals of about 90 degrees in central angle. Other four virtual straight lines Le, Lf, Lg and Lh extending toward the axis of rotation of the disk 405 from the other four optical heads 406 disposed at the other side B of the disk have equiangular intervals of about 90 degrees in central angle as well. All these lines have equiangular intervals of about 45 degrees in central angle. Eight rod-like bias magnets 407 are disposed to correspond to the eight optical heads 406 across the disk 405. The axes of the four bias magnets 407 corresponding to the heads 406 disposed at the side A of the disk 405 extend along the four virtual straight lines La, Lb, Lc and Ld. The axes of the other four bias magnets 407 corresponding to the other heads 406 disposed at the other side B of the disk 405 extend along the other four virtual straight lines Le, Lf, Lg and Lh.

The eight optical heads 406 are provided with head control circuits 430 which are independent of each other and are subjected to collective optimal regulation by a collective controller 431.

Each of the upper an lower sides of a two-side-equivalent cassette 411 for the apparatus has eight passage openings 412a corresponding to the four optical heads 406 and the four bias magnets 407 and disposed at equiangular intervals of about 45 degrees in central angle along the circumference of the disk 405, as shown in FIG. 16.

Except for the number of the optical heads 406 and that of the bias magnets 407, the apparatus has nearly the same constitution as the preceding embodiment. Since the number of the heads 406 is twice as many as that of the heads of the preceding apparatus and eight times as many as that of the head of the conventional apparatus, the time which it takes for the present apparatus to record, reproduce and erase data is greatly shortened to reduce the access time of the apparatus and heighten the data transfer speed thereof very much in comparison with the conventional and the preceding apparatuses.

A sixth embodiment of the present invention is hereafter described with reference to the drawings attached hereto. The equivalents of the portions of FIG. 11 are herein denoted by the same reference symbols as the portions.

FIG. 11 is a schematic view of a major of a magneto-optical disk apparatus which is the sixth embodiment. FIG. 12 is a partial plan view of the apparatus to illustrate the disposition of the optical heads thereof. The apparatus includes the four optical heads 406, optical head control circuits 430 which are drive control units independent of each other, a collective controller 431 for the collective optimal regulation of the circuits, and an interface 432 connected to a host computer C.

Two of the four optical heads 406 are disposed at one side A of a magneto-optical disk 405, and the other two of the heads are disposed at the other side B of the disk, as shown in FIG. 12. If the number of the optical heads were increased, the apparatus would be shortened in access time and heightened in data transfer speed. However, since the movable optical systems 421 of the heads 406 need to be moved to be opposed to the innermost edge of the data storage portion of the disk 405, the number of the heads is set at two for each side of the disk so as to prevent the systems from interfering with each other at the time of the movement.

Figure 17:
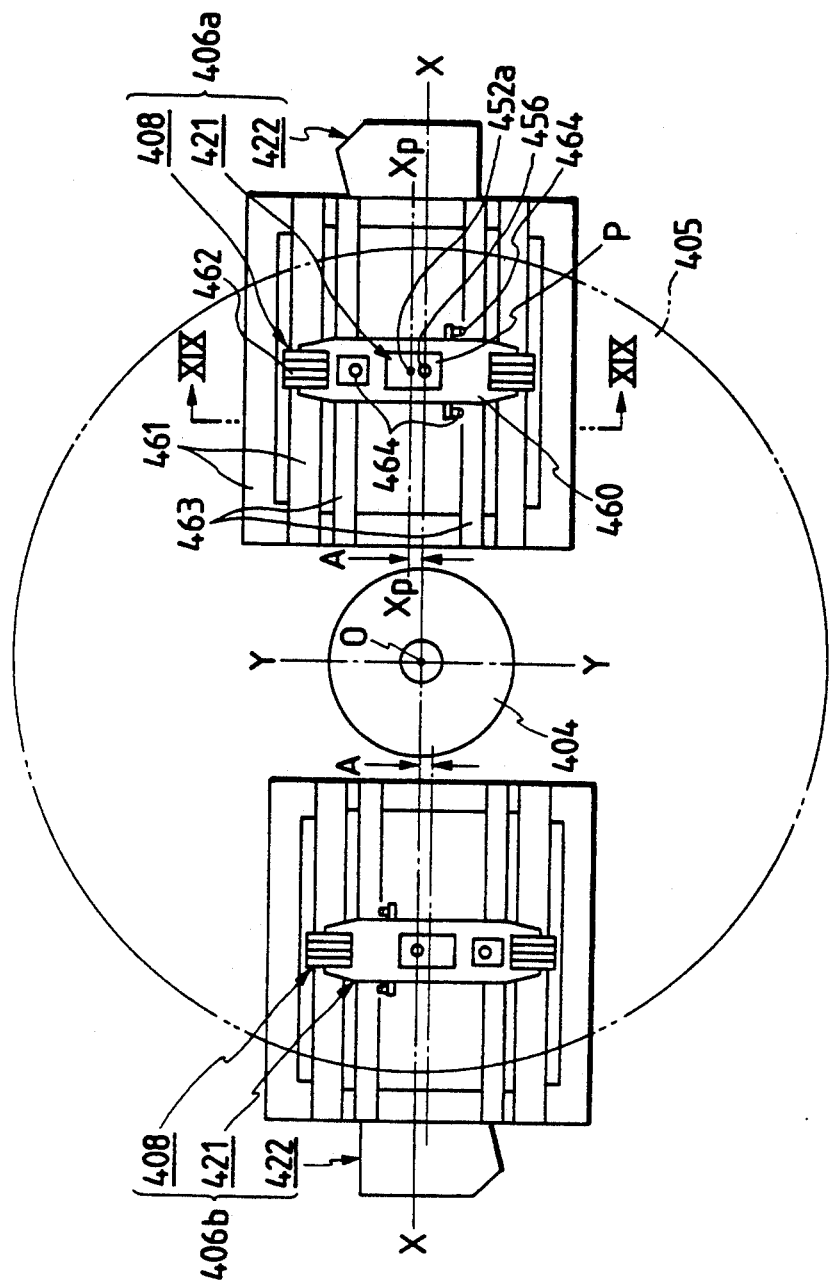
FIG. 17 is a partial plan view showing the disposition of the optical heads which is a sixth embodiment of the invention.
Figure 18:
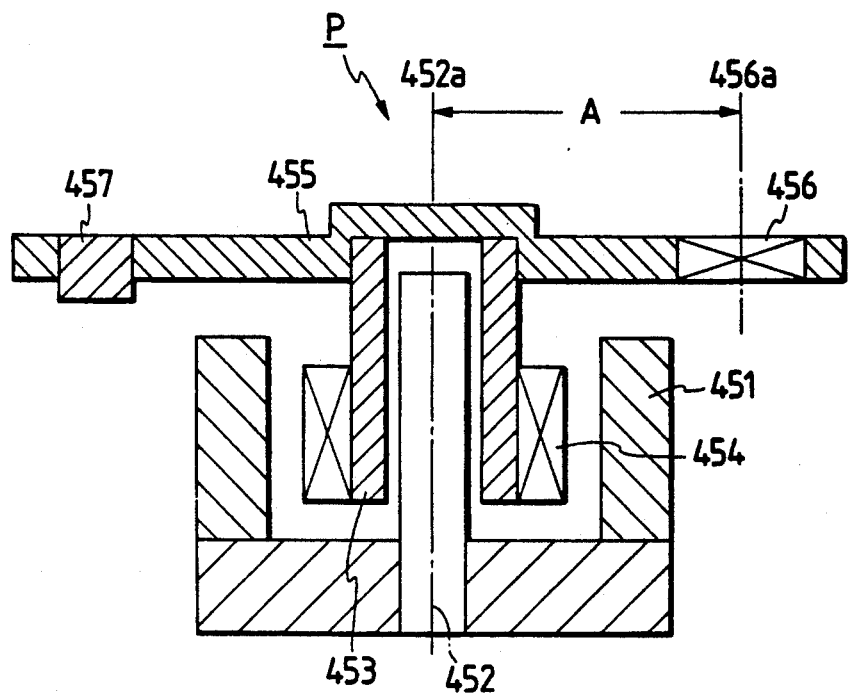
FIG. 18 is a cross-sectional view of an optical pick-up of the embodiment.
Figure 19:
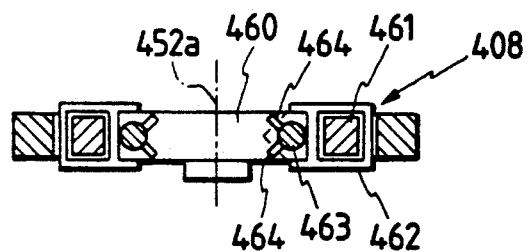
FIG. 19 is a cross-sectional view from lines XIX-—XIX shown in FIG. 17.

FIG. 17, 18 and 19 show a major part of a magneto-optical disk apparatus which is the sixth embodiment. The apparatus includes an even number of optical heads 406 for each side of a magneto-optical disk 405. The movable optical systems 421 of the heads 406 include optical pickups P of the shaft slide type. The two optical heads 406 disposed at one side A of the disk 405 are located symmetrically to each other about the axis O of rotation of a spindle motor 404, which is coincident with the axis of rotation of the disk, as shown in FIG. 17. The motor 404 is for rotating the disk 405. The axis Xp of movement of the optical pickup P of each of the heads 406a and 406b extends on the axis 452a of the sliding shaft 452 of the pickup so that there is a distance A between the movement axis Xp and the center line X of the disk 405 with regard to FIG. 17. The objective lens 456 of the optical pickup P mounted on a carriage 460 on which the movable optical system 421 of the optical head is mounted can be moved along the radial direction of the disk 405 as the optical axis 456a of the lens remains on the center line X extending on the axis O of rotation of the spindle motor 404. For the movement, the carriage 460 can be moved back and forth along the radial direction of the disk 405 by a linear motor 408 while being guided by a guide means including ball bearing 464 and guide bars 463.

The optical pickup P includes a magnetic circuit 451, the sliding shaft 452 vertically extending at the center of the circuit, a sleeve 453 fitted on the shaft so as to be slidable relative thereto to move vertically and rotate about the shaft, and a tracking and a focusing coils 454 provided on the lower portion of the sleeve, as shown in FIG. 18. The objective lens 456, through which a laser beam is transmitted, is attached with a plate 455 to the upper portion of the sleeve 453 so that the optical axis 456a of the lens is located at the distance A from the axis 452a of the sliding shaft 452, which is the center line of the pickup P. A counterweight 457 is attached to the plate 455 opposite the lens 456 so as to balance thereto to make it possible to rapidly move the optical head.

The range of the tracking movement of the optical pickup P, which is performed for the fine adjustment of the position of the objective lens 456 by revolving it about the sliding shaft 452, is narrow. The wide-range tracking movement of the pickup P is performed by moving it as a whole. For that purpose, the carriage 460 on which the pickup P is mounted is rapidly moved by the linear motor 408 so that the movable optical system 421 is opposed to the aimed track of the disk 405. The pickup P is mounted on the carriage 460 so that the axis 452a of the sliding shaft 452, which is the center line of the pickup, is coincident with the center line of the carriage, and the optical axis 456a of the objective lens 456 of the pickup extends at the distance A from the movement axis Xp of the pickup, which extends on the axis of the shaft. If the optical axis 456a of the lens 456 were not on the center line X of the disk 405, the magnetic domain of the disk, from which data were to be read, would extend obliquely to the locus of the optical axis so as to make it impossible to read the data from the domain. To avoid that problem, the movable optical system 421 of the optical head 406a is disposed so that the axis 452a of the sliding shaft 452, which is the center line the pickup P, is located at the distance A up from the center line X of the disk 405, which extends on the axis O of rotation of the spindle motor 404, with regard to FIG. 17. For the same purpose, the movable optical system 421 of the other optical head 406b is disposed so that the axis 452a of the sliding shaft 452, which is the center line of the pickup P, is located at the distance A down from the center line X of the disk 405, which extends on the axis O of rotation of the spindle motor 404, with regard to FIG. 17. The optical heads 406a and 406b are thus disposed symmetrically to each other about the axis O of rotation of the spindle motor 404. The other optical heads 406c and 406d disposed at the other side B of the disk 405 have the same positional relationship as the former heads.

The linear motor 408 for moving the carriage 460 along the radial direction of the magneto-optical disk 405 includes yokes 461 extending along the direction at both the sides of the center line X of the disk, and movable coils 462 attached to the carriage 460 at both the ends thereof, as shown in FIG. 19. The carriage 460 extends rectangularly across the yokes 461. The application of electricity to the movable coils 462 is controlled to move the carriage 460 to a position corresponding to the aimed track of the disk 405. The guide bars 463 for guiding the carriage 460 for the movement have circular cross sections, and extend through the carriage. The carriage 460 is supported with the ball bearings 464, each pair of which roll on the upper and lower portions of the guide bars 463 to smooth the movement of the carriage. Each optical head 406 includes the three pairs of the ball bearing 464 so that the pairs are on the vertices of a triangle, two of the pairs are on one of the two guide bars 463, and the other of the pairs is on the other of the bars. It is conceivable that two pairs of ball bearings 464 are provided for each of the two guide gars 463, namely, four pairs of the ball bearings are provided for the two guide bars. In that case, however, one of the four pairs of the ball bearing goes out of contact with the guide bar to cause a slip noise. For that reason, it is preferable that the three pairs of the ball bearings 464 are provided for the two guide bars 463. The combinations of the ball bearings 464 of the optical heads 406a and 406b are disposed symmetrically to each other about the axis O of rotation of the spindle motor 404. Since the components of the optical heads are disposed symmetrically to each other about the axis O of rotation of the motor 404, the specifications of the components can be equalized to each other to make the component interchangeable to each other to heighten the mass-producing property of the heads.

The optical pickup P may not be of the shaft slide type, but of another type such as a conventional leaf spring support type. It is preferable that when the magneto-optical disk apparatus is designed to be capable of being postured either horizontally or vertically to economize the installation space therefor, two optical heads 406 are horizontally disposed. the reason for this is that if the optical heads are vertically disposed, the power for driving the movable optical system 421 by the linear motor 408 differs between the upward and downward driving of the system due to gravity.

Although the rod-like bias magnets 407 are provided to extend in parallel with optical disk and correspond to the optical heads 406 access the disk in each of the embodiments, optical head and bias magnet integrations may be provided at both the sides of the disk instead of the heads and the magnets. If the integrations are provided, a two-side-equivalent cassette having two passage opening in each of the upper an lower sides of the cassette may be used for the former embodiment, and a two-side-equivalent cassette having four passage openings in each of the upper an lower sides of the cassette may be used for the latter embodiment.

Instead of the bias magnet 407 of each of the embodiments, which is a rodlike permanent magnet, an electromagnet including one or more coils, or a floating magnetic head may be provided.

Figure 14:
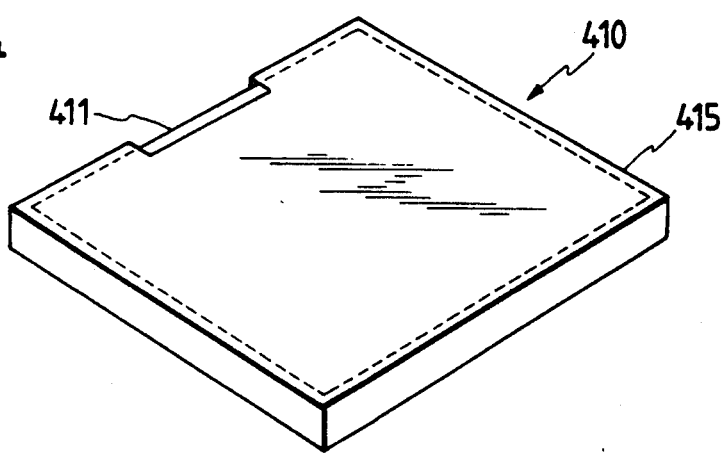
FIG. 14 is a perspective view of a protective casing in which the cassette is put.

As far as the protective casing 415 functions to cover the passage openings 412a and the center hole 412b at the time of the nonuse of the disk 405 so as to prevent dust or the like from entering to the disk in the cassette 411, the form of the casing is not confined to that shown in FIG. 14.

Although the turntable 402 is supported with ball hearings 403 in each of the embodiments, bearings having dynamic pressure generation grooves may be provided instead of the ball bearings.

Instead of the semiconductor laser module 425 which emits the single laser beam, a multiple-beam semiconductor laser module which emits a plurality of laser beam such as three, four or eight laser beam may be provided. If the multiple-beam semiconductor laser module is provided to emit the plural laser beams to irradiate them upon the disk 405 through the optical head 406, the data transfer speed of the apparatus is much more heightened.

The optical head 406 may include three semiconductor laser modules for erasure, recording and reproduction of data, respectively, to more heighten the data transfer speed of the apparatus.

The present invention can also be embodied as an optical disk drive an read/write apparatus having a direct writing function, an optical disk drive and read/write apparatus for a phase-changed optical disk, or the like.

Instead of the collective regulation modes for the controller 431, other collective regulation modes may be provided in software.

Each of the optical disk drive and read/write apparatuses which are the embodiments may be either of the vertical type or of the horizontal type.

A seventh embodiment of the present invention is hereafter described with reference to the drawings attached hereto.

Figure 20:
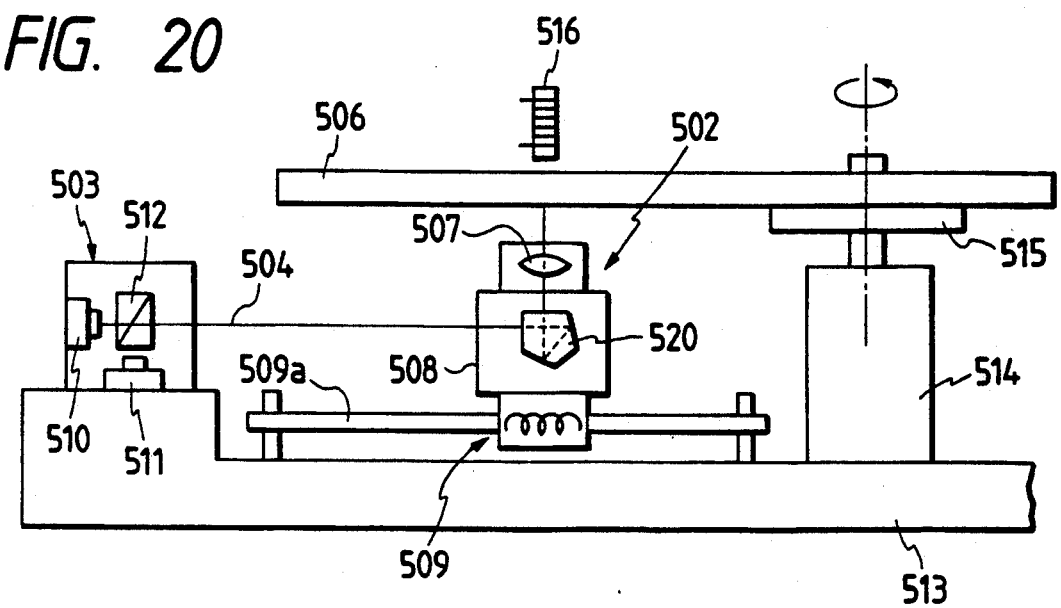
FIG. 20 is a schematic view of a major part of an optical disk drive an read/write apparatus including an optical head which is a seventh embodiment of the present invention.
Figure 21:
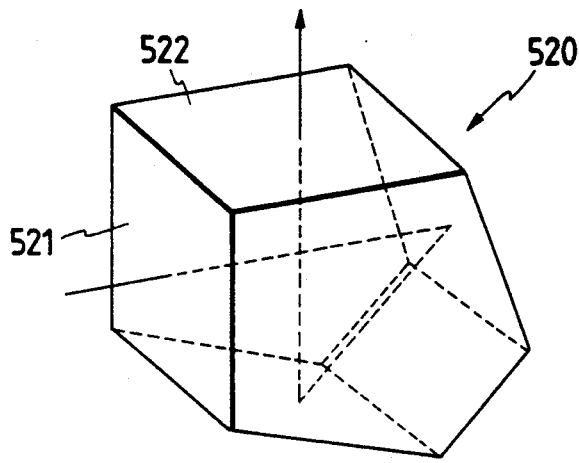
FIG. 21 is a perspective view of a pentaprism as the beam diverting means of the head.
Figure 22:
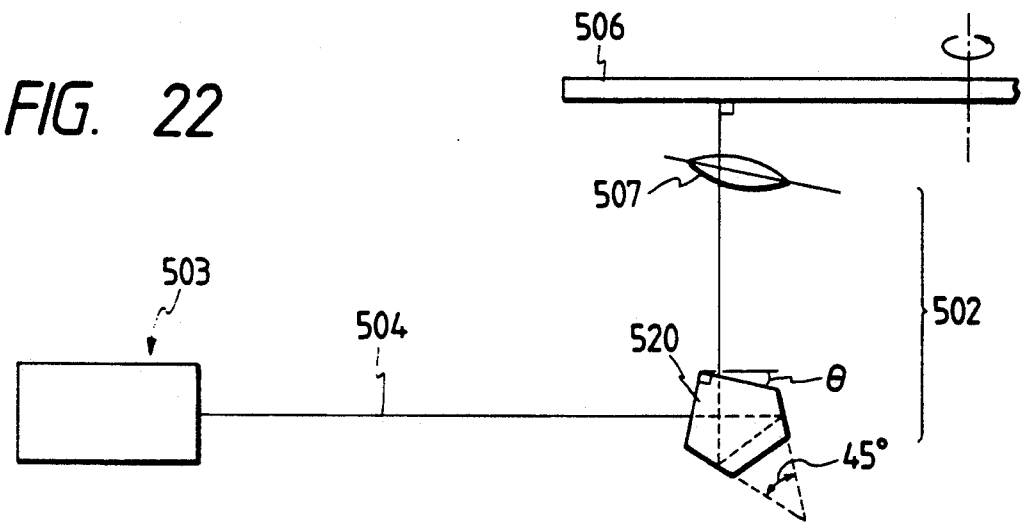
FIG. 22 is a view to illustrate the operation of the pentaprism.
Figure 23:
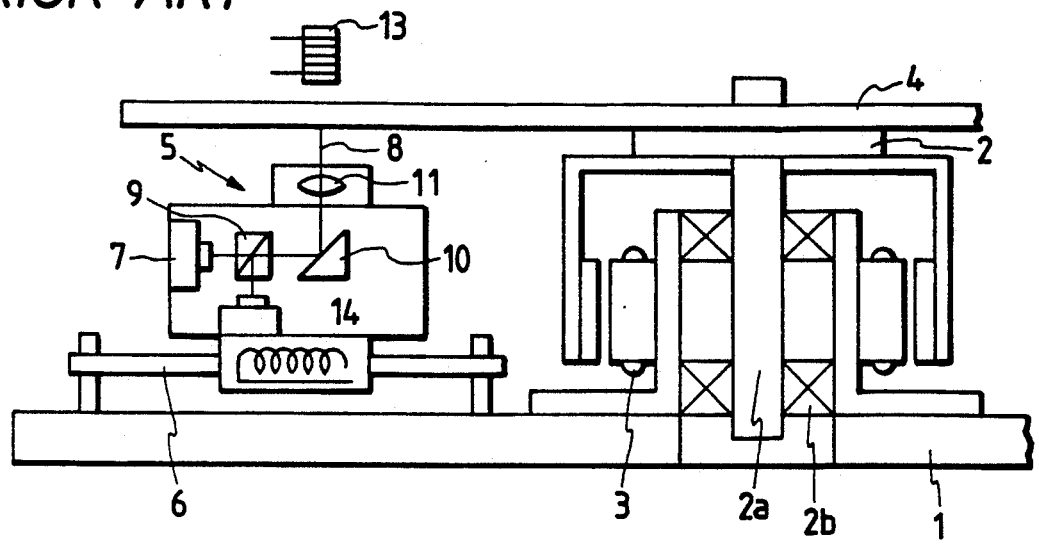
FIG. 23 is a schematic view of a major part of a conventional drive and drive/write apparatus for an optical disk.
Figure 24:
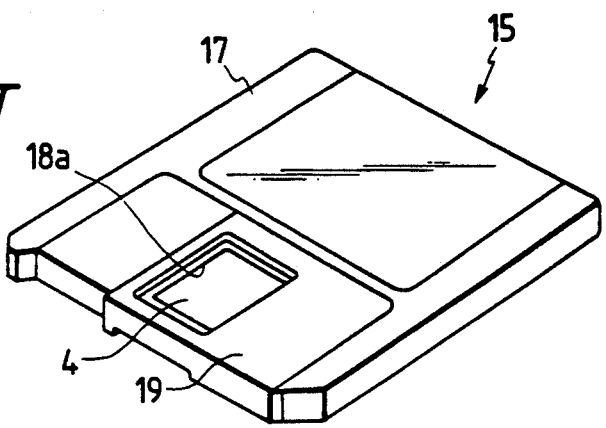
FIG. 24 is an upper perspective view of a conventional cassette for the optical disk to be handled by the conventional apparatus.
Figure 25:
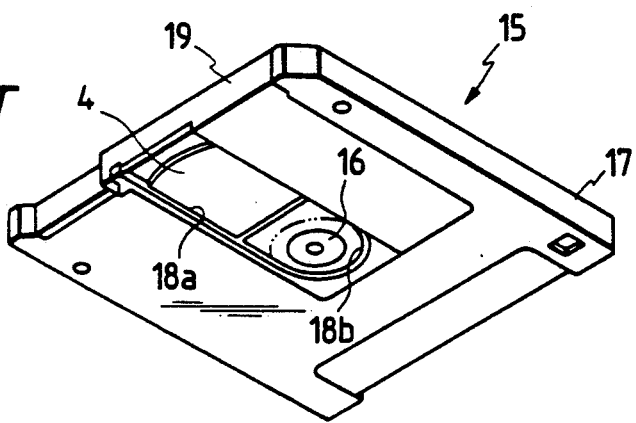
FIG. 25 is a lower perspective view of the cassette shown in FIG. 23.
Figure 26:
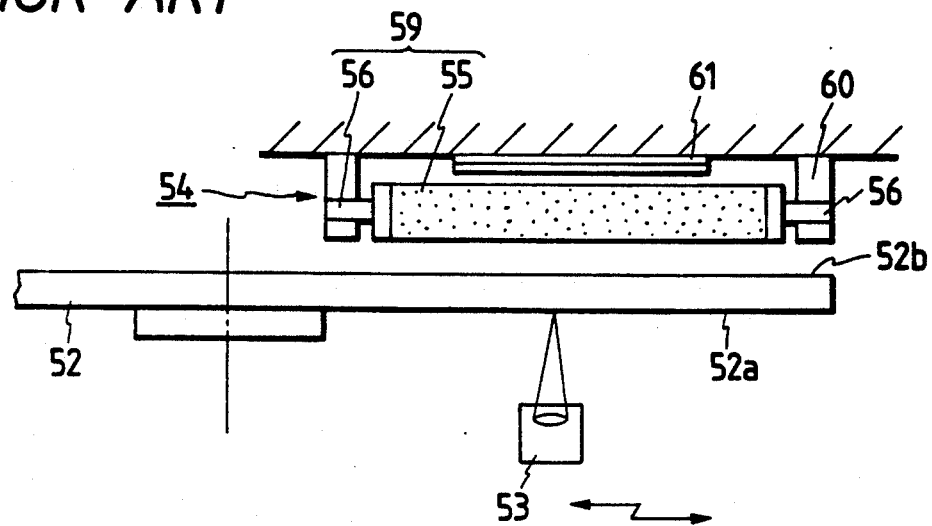
FIG. 26 is a front view of a conventional bias magnet device.
Figure 27:
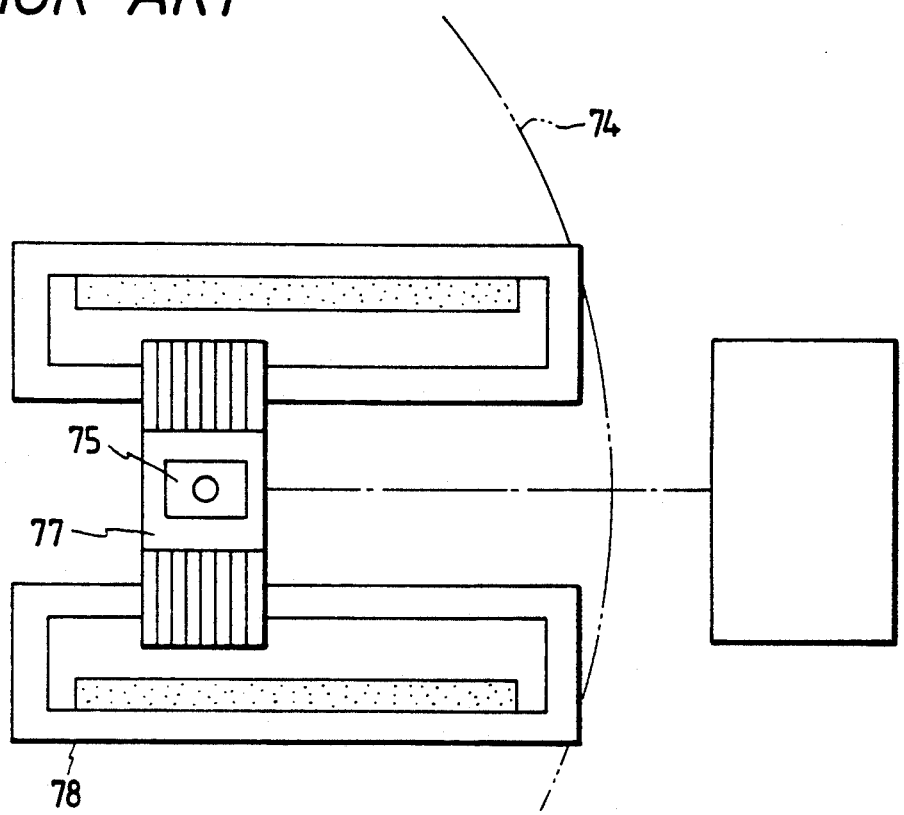
FIG. 27 is a plan view of a conventional linear motor.

FIG. 20 is a schematic view of a major part of an optical disk drive an read/write apparatus including an optical head which is the seventh embodiment. FIG. 21 is a perspective view of a pentaprism 520 as a beam diverting means. FIG. 22 is a view to illustrate the operation of the pentaprism.

The optical head is dividedly made of a movable optical system 502 and a fixed optical system 503. The movable optical system 502, which is moved by a linear motor 509, is small enough in weight to shorten the seek time of the apparatus to an optical disk 506. The movable optical system 502 includes an objective lens 507, and the pentaprism 520 provided as a beam diverting means instead of an upward diverting mirror such as that 505 of the conventional optical head. The pentaprism 520 has an incident facet 521 and an outgoing facet 522 perpendicular thereon. The objective lens 507 is disposed to always exited in parallel with the outgoing facet 522.

The fixed optical system 503 includes a semiconductor laser module 510, a position detecting photodiode 511, an a beam splitter 512, and is secured to the base 513 of the apparatus. The beam splitter 512 functions so that a laser beam 504 horizontally emitted from the laser module 510 is guided to the pentaprism 520, and light reflected from the disk 506 is separated from beam and guided to the photodiode 511.

The optical disk 506 clamped to a turntable 515 is rotated at a prescribed speed by a spindle motor 514 provided on the base 513. The movable optical system 502 of the optical head is moved by the linear motor 509 so as to be opposed to a prescribed position on the disk 506 to read or write data from or in the disk, namely, to erase, record or reproduce data from or in the disk.

The record of write new data in the disk 506, the laser beam 504 is horizontally emitted from the semiconductor laser module 510, transmitted to the pentaprism 520 through the beam splitter 512, diverted upward by the prism, and concentrate to the position of the recording or writing in the disk through the objective lens 507 so that a small spot is made of the beam on the surface of the film of the disk to heat the beam-irradiated portion thereof above the Curie temperature of the disk to magnetize the portion in the direction of the magnetic field of a bias magnet 516 to erase existing data from the portion first. By the time the disk 506 is thereafter rotated by another round to have the same positional relationship with the optical head at the time of the erasure, a direction is selected for the magnetic field of the bias magnet 516 so as to be coincident with the direction of magnetization of the portion of the disk for the new data. The portion is then heated by the spot of the beam 504 thereon so as to be magnetized in the selected direction to record or write the new data in the portion.

To reproduce or read data from the optical disk 506, the laser beam 504 is made lower in intensity than at the time of the recording or writing, and irradiated upon the disk to heat it below the Curie temperature thereof. The movable optical system 502 of the optical head is move by the linear motor 509 so as to be opposed to the recorded position of the data in the disk 506 to irradiate the leaser beam 504 upon the position. The direction of rotation of the plane of polarization of the disk-reflected light changes depending on the diction of magnetization of the magneto-optical film of the beam-irradiated portion of the disk 506. The changed direction is detected to reproduce or read the data.

The operation of the optical head is described in detail from now on. When the carriage 508 performs a pitching motion about an axis X due to the slight clearance between the guide 509a and un-shown bearing if the linear motor 509 a the movable optical system 502 of the head is moved by the motor along the radial direction of the disk 506, in the direction of an axis Y, the carriage tilts by a pitching angle $\theta$. As a result, the pentaprism 520 an the objective lens 507 also tilt by the pitching angle $\theta$ so that the incident angle of the laser beam 504 to the incident facet 521 of the prism deviates from a proper value by the pitching angle.

Since the pentaprism 520 functions so that the incident light thereto is always bent by at angle of 90 degrees through the prism, the lease beam 504 transmitted from the fixed optical system 503 to the movable one 502 is irradiated upon the surface of the disk 506 always perpendicularly thereto. In order words, even if the pentaprism 520 tilts by the pitching angle $\theta$, the laser beam 504 transmitted from the fixed optical system 503 to the pentaprism 520 of the movable optical system 502 is always bent by an angle of 90 degrees through the prism so that the beam is irradiated upon the surface of the disk 506 always perpendicularly thereto. As a result, the efficiency of concentration of the beam 504 to the disk 506 is always high.

Therefore, the efficiency is not affected by the pitching motion of the movable optical system 502, which takes place due to the clearance between the guide 509a and bearing of the linear motor 509 as the system is move by it. This makes it possible to enlarge the range of the tolerance for the pitching motion.

Instead of the semiconductor laser module 510 which emits the single laser beam, a multiple-beam semiconductor laser module which emits plurality of laser beams such as three, four or eight beams may be provided.

Although the movable optical system 502 is deposed under the disk 506, the system maybe disposed over it.

The present invention may also be applied to an optical disk drive and read/write apparatus having a direct writing function to perform recording and erasure simultaneously, an optical disk drive an read/write apparatus for a phase-change optical disk, or the like.

In an optical disk drive and read/write apparatus provided in accordance with the first aspect of the present invention, four optical heads are disposed on a circle so that four virtual straight lines extending from the heads toward the axis of rotation of the apparatus have equiangular intervals of about 90 degrees in central angle. For that reason, the erasure, recording and reproduction of data can be performed from and in an optical disk through the optical heads to heighten the apparatus in access speed and data transfer speed.

In addition, in a bias magnet device provided in accordance with the second aspect of the present invention, a plurality of permanent magnets each made of a rare-earth element to have string magnetism but be difficult to be made large in length in length are coupled to each other in the axial direction of the magnets and held by a reinforcing member so as to constitute a single bias magnet of large length and strong magnetism. This result in reducing the restrictions on the magnetizability of a magneto-optical disk which is large in diameter and to which the device is applied. Besides, the reinforcing member is made small in weight to decrease the inertia of the movable part of the device to shorten time which it takes to turn the part over to reverse the direction of the magnetic field of the magnets. This results in shortening the access time of a magneto-optical disk drive and read/write apparatus including the device. Desirable effects are thus produced.

Further, according to the third aspect of the present invention, an optical head is moved by a linear motor provided with a linear scale whose graduations have a pitch equal to that of the lead grooves of an optical disk or to the product of the latter pitch and the reciprocal of an integer. For that reason, the movement can be rapidly performed to shorten the time which it takes to position the head. In other words, the aimed track of the disk can be rapidly sought through the head to shorten the access time of an optical disk drive and read/write apparatus.

Since the linear scale is located downright under or over the objective lens of the optical head, the positioning of the head is hardly affected by the yawing motion of a carriage. For that reason, the errors in the reading of positional information from the disk are reduced.

Furthermore, in an optical disk drive and read/write apparatus provided in accordance with the fourth and fifth aspects of the present invention, a plurality of optical heads are disposed on circles at both the sides of the optical disk so that virtual straight lines extending from the heads toward the axis of rotation of the disk at each of the sides form mutually-equal central angles between the lines. For that reason, data can be erased, recorded and reproduced from and in the disk through the heads independently of each other or in a fixedly allocated manner. As a result, the apparatus can be heightened in access speed and data transfer speed. Besides, the erasure, recording and reproduction can be simultaneously performed from and the disk on both the sides thereof.

Still further, the movable optical system of a divided-type optical head provided in accordance with the sixth aspect of the present invention includes a pentaprism as a beam diverting means so that a laser beam is irradiated upon the surface of an optical disk always perpendicularly thereto through the prism even if the posture of the system changes during the movement thereof. As a result, the efficiency of concentration of the laser beam to the disk by the head is high.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An optical disk driving apparatus comprising:
   a driving means for rotating a magneto-optical disk held on a turntable;
   a beam polarizing means for polarizing a laser beam emitted from a laser source in a direction toward a magnetized information area;
   an optical head member having an objective lens for converging said polarized laser beam on said information area, said optical head member being opposed to said optical disk; and
   a linear motor mechanism for moving said optical head member along the radial direction of said disk to a predetermined position of said information area of said optical disk,
   wherein said optical head member comprises at least two optical heads facing on at least one side of said disk,
   said optical heads being disposed on the circumference of a circle and having an equiangular interval,
   said optical heads operative to independently perform an erasure, recording and reproduction of data from and in said disk through said optical heads, and said optical heads having the same composition, respectively;
   further wherein the optical axis of the objective lens is moved along the radial direction of said disk by said linear motor mechanism so that the optical axis of the objective lens is on a center line extending on the axis of rotation of said disk.

2. An optical disk driving apparatus according to claim 1, wherein said optical head member comprises four optical heads facing on the one side of said disk so that four virtual straight lines extending from said optical heads towards the axis of rotation of said disk have equiangular intervals of about 90 degrees in central angle.

3. An optical disk driving apparatus according to claim 2, wherein said information area of said disk is divided into four areas adjacent to each other in the radial direction of said disk, and said four optical heads are allocated to the areas, respectively, to perform an erasure, recording and reproduction of data from and in the area independently of each other.

4. An optical disk driving apparatus according to claim 2, in which said information area of said disk is divided into two areas adjacent to each other in the radial direction of said disk, and the erasure, recording and reproduction of data are performed from and in the areas independently of each other through two optical heads for the reproduction and recording and the other two optical heads for the erasure.

5. An optical disk driving apparatus according to claim 2, in which erasure, recording and reproduction of data are performed through each of three optical heads, and the other optical head is prepared as a backup.

6. An optical disk driving apparatus according to claim 2, in which said four optical heads can be freely moved between the innermost and outermost edges of said information area of said disk along the radial direction thereof to perform erasure, recording and reproduction of data from and in said disk through said optical heads independently of each other.

7. An optical disk driving apparatus according to claim 1, in which said optical disk is a magneto-optical disk, and in which said optical disk driving apparatus further includes a bias magnet means for magnetizing an information area of said magnetooptical disk into a predetermined direction, said bias magnet means comprising:
   a movable part having a plurality of permanent magnets coupled to each other in the axial direction thereof and a reinforcing member for reinforcing said magnets;

a bearing member for rotatably supporting said movable part; and a driving member for rotating said movable part.

8. An optical disk driving apparatus according to claim 1, in which said linear motor mechanism comprises:

a linear motor for moving said optical head member along the radial direction said an optical disk, said motor being provided with a linear scale whose graduations have one of a pitch equal to that of the track of said disk and a pitch equal to the reciprocal of an integer of said pitch; and a position detector for detecting said graduations.

9. An optical disk driving apparatus according to claim 1, wherein said optical head member comprises four optical heads, two of the four optical heads face on the one side of said disk, and the other two optical heads face on the other side of said disk.

10. An optical disk driving apparatus according to claim 9, wherein said two optical heads facing one side of said disk are disposed so that two head movement axes extending from said heads toward the axis of rotation of said disk have equiangular intervals of about 180 degrees in central angle; and the other two optical heads facing the other side of said disk are disposed so that two head movement axes extending from said heads toward the axis of rotation of said disk have equiangular intervals of about 180 degrees in central angle.

11. An optical disk driving apparatus according to claim 10, in which said two optical heads facing one side of said disk and said the other two optical heads facing the other side of said disk have equiangular intervals of about 90 degrees in central angle.

12. An optical disk driving apparatus according to claim 1, wherein said optical head member comprises eight optical heads, four of the eight optical heads face on the one side of said disk, and the other four optical heads face on the other side of said disk.

13. An optical disk driving apparatus according to claim 12, wherein said four optical heads facing one side of said disk are disposed so that four head movement axes extending from said heads toward the axis of rotation of said disk have equiangular intervals of about 90 degrees in central angle; and the other four optical heads disposed facing the other side of said disk so that four head movement axes extending from said heads toward the axis of rotation of said disk have equiangular intervals of about 90 degrees in central angle.

14. An optical disk driving apparatus according to claim 13, in which said four optical heads facing one side of said disk and said the other four optical heads facing the other side of said disk have equiangular intervals of about 45 degrees in central angle.

15. An optical disk driving apparatus according to claim 1, wherein said at least two optical heads are located symmetrically to each other about the axis of rotation of the optical disk.

16. An optical disk driving apparatus according to claim 15, wherein each of said heads includes a carriage, and an optical pickup which is of the shaft slide type and is mounted on said carriage; and said carriage is moved along the radial direction of said disk so that the optical axis of the objective lens of said pickup is on a center line extending on the axis of rotation of said disk.

17. An optical disk driving apparatus according to claim 1, in which said beam polarizing means is a pentaprism.

18. An optical disk driving apparatus comprising:

a driving means for rotating a magneto-optical disk held on a turntable;

a beam polarizing means for polarizing a laser beam emitted from a laser source in a direction toward a magnetized information area;

an optical head member having an objective lens for converging said polarized laser beam on said information area, said optical head member being opposed to said optical disk; and a linear motor mechanism for moving said optical head member along the radial direction of said disk to a predetermined position of said information area of said optical disk, wherein said optical head member comprises at least two optical heads facing on at least one side of said disk, and in which said optical disk is a magneto-optical disk, and in which said optical disk driving apparatus further includes a bias magnet means for magnetizing an information area of said magneto-optical disk into a predetermined direction, said bias magnetic means comprising:

a movable part having a plurality of permanent magnets coupled to each other in the axial direction thereof and a reinforcing member for reinforcing said magnets;

a bearing member for rotatably supporting said movable part; and a driving member for rotating said movable part.

* * * * *